United States Patent
Khedouri et al.

(10) Patent No.: US 7,881,656 B2
(45) Date of Patent: Feb. 1, 2011

(54) AUDIO VISUAL PLAYER APPARATUS AND SYSTEM AND METHOD OF CONTENT DISTRIBUTION USING THE SAME

(75) Inventors: Robert Khedouri, Roslyn, NY (US); Jonathan Axelrod, New York, NY (US); Harold Price, Bethel Park, PA (US); John Becker, Chadds Ford, PA (US); Mark Edinger, Perkasie, PA (US); Douglas R. Kraul, New York, NY (US)

(73) Assignee: SanDisk Corporation, Milpitas, CA (US)

( * ) Notice: Subject to any disclaimer, the term of this patent is extended or adjusted under 35 U.S.C. 154(b) by 0 days.

(21) Appl. No.: 11/964,107

(22) Filed: Dec. 26, 2007

(65) Prior Publication Data
US 2008/0160908 A1 Jul. 3, 2008

Related U.S. Application Data

(60) Division of application No. 11/780,535, filed on Jul. 20, 2007, and a continuation-in-part of application No. 10/953,746, filed on Sep. 29, 2004.

(60) Provisional application No. 60/807,840, filed on Jul. 20, 2006, provisional application No. 60/943,675, filed on Jun. 13, 2007.

(51) Int. Cl.
*H04H 20/71* (2008.01)
*H04H 40/00* (2008.01)
*H04B 7/00* (2006.01)
*H04K 11/00* (2006.01)

(52) U.S. Cl. .................. 455/3.01; 455/3.06; 455/66.1; 455/344

(58) Field of Classification Search ................ 455/3.01, 455/3.04, 3.06, 66.1, 344
See application file for complete search history.

(56) References Cited

U.S. PATENT DOCUMENTS

| | | | |
|---|---|---|---|
| 4,446,491 | A | 5/1984 | Tidd et al. |
| 5,179,660 | A | 1/1993 | Devany et al. |
| 5,835,721 | A | 11/1998 | Donahue et al. |

(Continued)

FOREIGN PATENT DOCUMENTS

| | | |
|---|---|---|
| JP | 10304460 | 11/1998 |

(Continued)

OTHER PUBLICATIONS

Apple Computer Inc., "iTunes 4"(Online), Aug. 1, 2003, pp. 1-2, XP002466946, Internet.

(Continued)

*Primary Examiner*—Tilahun Gesesse
(74) *Attorney, Agent, or Firm*—Brinks Hofer Gilson & Lione

(57) ABSTRACT

A system is presented providing content to a plurality of handheld devices (including musical selections). The devices can access a server over the Internet via a WIFI or other similar wireless interconnection and can download songs requested by a user from the server or from other users using, e.g., a P2P protocol. All downloads are governed by applicable DRM rules. Content and playlists may also be pushed by a server from other sources and means including, e.g., podcasting, based on predetermined rules, favorite preferences of users, and other criteria.

22 Claims, 17 Drawing Sheets

U.S. PATENT DOCUMENTS

| | | | |
|---|---|---|---|
| 6,138,158 A | 10/2000 | Boyle et al. | |
| 6,175,860 B1* | 1/2001 | Gaucher | 709/208 |
| 6,208,269 B1* | 3/2001 | Brodie et al. | 455/3.01 |
| 6,248,946 B1 | 6/2001 | Dwek | |
| 6,289,212 B1 | 9/2001 | Stein et al. | |
| 6,372,974 B1 | 4/2002 | Gross et al. | |
| 6,405,261 B1* | 6/2002 | Gaucher | 709/250 |
| 6,407,680 B1 | 6/2002 | Lai et al. | |
| 6,697,944 B1* | 2/2004 | Jones et al. | 713/168 |
| 6,721,288 B1 | 4/2004 | King et al. | |
| 6,757,706 B1 | 6/2004 | Dong et al. | |
| 6,799,219 B1 | 9/2004 | Sugahara et al. | |
| 6,868,494 B1 | 3/2005 | Shitara et al. | |
| 6,883,168 B1 | 4/2005 | James et al. | |
| 6,886,036 B1 | 4/2005 | Santamaki et al. | |
| 6,941,134 B2 | 9/2005 | White | |
| 6,950,988 B1 | 9/2005 | Hawkins et al. | |
| 6,954,763 B2 | 10/2005 | Nunome et al. | |
| 7,031,931 B1 | 4/2006 | Meyers | |
| 7,039,686 B1 | 5/2006 | Arisawa et al. | |
| 7,085,744 B2 | 8/2006 | Morrison | |
| 7,110,838 B1 | 9/2006 | Tada | |
| 7,112,138 B2 | 9/2006 | Hedrick et al. | |
| 7,136,945 B2 | 11/2006 | Gibbs et al. | |
| 7,206,559 B2* | 4/2007 | Meade, II | 455/151.1 |
| 7,215,923 B2 | 5/2007 | Hillyard | |
| 7,275,105 B2 | 9/2007 | Bloch et al. | |
| 7,343,384 B2 | 3/2008 | Plastina et al. | |
| 7,356,557 B2 | 4/2008 | Kikuchi et al. | |
| 7,426,537 B2 | 9/2008 | Lee et al. | |
| 7,471,665 B2* | 12/2008 | Perlman | 370/338 |
| 7,500,269 B2 | 3/2009 | Huotari et al. | |
| 7,522,675 B2 | 4/2009 | Sheynman et al. | |
| 7,533,158 B2 | 5/2009 | Grannan et al. | |
| 7,587,001 B2* | 9/2009 | Hazani et al. | 375/316 |
| 7,603,434 B2 | 10/2009 | Svendsen | |
| 7,680,941 B2 | 3/2010 | Bloch et al. | |
| 7,685,643 B2 | 3/2010 | Lee et al. | |
| 7,689,510 B2 | 3/2010 | Lamkin et al. | |
| 7,711,838 B1 | 5/2010 | Boulter et al. | |
| 7,724,907 B2 | 5/2010 | Candelore | |
| 7,725,582 B2 | 5/2010 | Nadarajah | |
| 7,730,300 B2 | 6/2010 | Candelore | |
| 7,765,326 B2 | 7/2010 | Robbin et al. | |
| 7,836,136 B1 | 11/2010 | Alfke | |
| 2001/0018858 A1 | 9/2001 | Dwek | |
| 2001/0042107 A1 | 11/2001 | Palm | |
| 2001/0047272 A1 | 11/2001 | Frietas et al. | |
| 2002/0065817 A1 | 5/2002 | Ito et al. | |
| 2002/0065902 A1 | 5/2002 | Janik et al. | |
| 2002/0120501 A1 | 8/2002 | Bell et al. | |
| 2002/0138576 A1 | 9/2002 | Schleicher et al. | |
| 2003/0014630 A1 | 1/2003 | Spencer et al. | |
| 2003/0017826 A1 | 1/2003 | Fishman et al. | |
| 2003/0018543 A1 | 1/2003 | Alger et al. | |
| 2003/0126086 A1 | 7/2003 | Safadi | |
| 2003/0145093 A1 | 7/2003 | Oren et al. | |
| 2003/0191753 A1 | 10/2003 | Hoch | |
| 2003/0225834 A1 | 12/2003 | Lee et al. | |
| 2004/0047304 A1 | 3/2004 | Takahashi et al. | |
| 2004/0068524 A1 | 4/2004 | Aboulhosn et al. | |
| 2004/0073924 A1 | 4/2004 | Pendakur | |
| 2004/0087326 A1 | 5/2004 | Dunko et al. | |
| 2004/0120688 A1 | 6/2004 | Poltorak | |
| 2004/0132438 A1 | 7/2004 | White | |
| 2004/0133657 A1 | 7/2004 | Smith et al. | |
| 2004/0199657 A1 | 10/2004 | Eyal et al. | |
| 2004/0235455 A1 | 11/2004 | Jiang | |
| 2004/0261126 A1 | 12/2004 | Addington et al. | |
| 2005/0034164 A1 | 2/2005 | Sano et al. | |
| 2005/0070259 A1 | 3/2005 | Kloba et al. | |
| 2005/0091167 A1 | 4/2005 | Moore et al. | |
| 2005/0097007 A1 | 5/2005 | Alger et al. | |
| 2005/0102379 A1 | 5/2005 | Su et al. | |
| 2005/0134578 A1 | 6/2005 | Chambers et al. | |
| 2005/0169219 A1 | 8/2005 | Serpa et al. | |
| 2005/0193209 A1 | 9/2005 | Saunders et al. | |
| 2005/0243240 A1* | 11/2005 | Choi et al. | 349/58 |
| 2005/0245240 A1 | 11/2005 | Balasurya et al. | |
| 2005/0256909 A1 | 11/2005 | Aboulhosn et al. | |
| 2005/0262251 A1 | 11/2005 | Klemets et al. | |
| 2006/0008256 A1* | 1/2006 | Khedouri et al. | 386/124 |
| 2006/0025068 A1* | 2/2006 | Regan et al. | 455/3.01 |
| 2006/0041943 A1 | 2/2006 | Singer et al. | |
| 2006/0056324 A1* | 3/2006 | Hyyppa et al. | 370/310 |
| 2006/0074808 A1* | 4/2006 | Boesen | 705/51 |
| 2006/0114831 A1 | 6/2006 | Buduma et al. | |
| 2006/0123053 A1 | 6/2006 | Scannell | |
| 2006/0159109 A1* | 7/2006 | Lamkin et al. | 370/401 |
| 2006/0161635 A1* | 7/2006 | Lamkin et al. | 709/217 |
| 2006/0190410 A1* | 8/2006 | Harper | 705/59 |
| 2006/0200440 A1 | 9/2006 | Choi et al. | |
| 2006/0218248 A1 | 9/2006 | Shiina | |
| 2006/0288112 A1* | 12/2006 | Soelberg et al. | 709/231 |
| 2007/0077921 A1 | 4/2007 | Hayashi et al. | |
| 2007/0177586 A1 | 8/2007 | Eyal et al. | |
| 2007/0180078 A1 | 8/2007 | Murphy et al. | |
| 2007/0220552 A1 | 9/2007 | Juster et al. | |
| 2008/0222243 A1 | 9/2008 | Shaw | |
| 2008/0250239 A1 | 10/2008 | Risan et al. | |
| 2009/0113536 A1 | 4/2009 | Zhang et al. | |

FOREIGN PATENT DOCUMENTS

| | | |
|---|---|---|
| JP | 2002-163560 | 6/2002 |
| WO | WO 2003/034773 | 4/2003 |
| WO | WO 2004/073242 | 8/2004 |

OTHER PUBLICATIONS

Corrected International Search Report and Written Opinion for PCT/US07/73943, dated Jun. 4, 2009, 12 pages.

Office Action for U.S. Appl. No. 11/964,076, dated May 29, 2009, 11 pages.

Office Action for U.S. Appl. No. 11/964,068, dated Oct. 2, 2009, 9 pages.

Office Action for U.S. Appl. No. 11/964,798, dated Sep. 14, 2009, 16 pages.

Office Action for U.S. Appl. No. 11/965,078, dated Sep. 3, 2009, 10 pages.

Office Action for U.S. Appl. No. 11/964,748, dated Mar. 4, 2010, 10 pages.

Office Action for U.S. Appl. No. 12/041,862, dated Apr. 12, 2010, 10 pages.

Office Action for U.S. Appl. No. 12/045,897, dated Apr. 14, 2010, 13 pages.

Office Action for U.S. Appl. No. 11/780,535, dated May 12, 2010, 9 pages.

Office Action for U.S. Appl. No. 11/964,068, dated May 26, 2010, 9 pages.

International Search Report and Written Opinion for PCT/US2007/73943, dated Oct. 16, 2008, 11 pages.

Office Action for U.S. Appl. No. 12/045,213, dated May 17, 2010, 9 pages.

Office Action for U.S. Appl. No. 12/041,903, dated Apr. 26, 2010, 17 pages.

Office Action for U.S. Appl. No. 10/953,746, dated Jan. 13, 2010, 11 pages.

Office Action for U.S. Appl. No. 11/964,090, dated Dec. 21, 2009, 7 pages.

Office Action for U.S. Appl. No. 11/964,798, dated Jan. 27, 2010, 16 pages.

Office Action for U.S. Appl. No. 12/045,184, dated Dec. 9, 2009, 8 pages.

Office Action for U.S. Appl. No. 12/045,822, dated Jan. 21, 2010, 13 pages.
Office Action for U.S. Patent Application Serial No. 12/045,809, dated Jan. 21, 2010, 13 pages.
European Search Report for European Patent Application Serial No. 04793951.7, dated Feb. 14, 2008, 4 pages.
International Search Report for PCT Patent Application Serial No. PCT/US2004/32321, dated Apr. 25, 2007, 8 pages.
Office Action for U.S. Appl. No. 12/045,297, dated Jun. 21, 2010, 15 pages.
Office Action for U.S. Appl. No. 11/965,030, dated Jun. 23, 2010, 10 pages.
Office Action for U.S. Appl. No. 11/964,182, dated Jun. 25, 2010, 9 pages.
Office Action for U.S. Appl. No. 11/964,798, dated Dec. 29, 2008, 14 pages.
Office Action for U.S. Appl. No. 10/953,746, dated Apr. 1, 2009, 12 pages.
Office Action for U.S. Appl. No. 11/780,535, dated Apr. 28, 2009, 9 pages.
Office Action for U.S. Appl. No. 11/964,748, dated Apr. 27, 2009, 10 pages.
Office Acton for U.S. Appl. No. 12/045,162, dated Nov. 10, 2010, 8 pages.
Office Action for U.S. Appl. No. 12/041,937, dated Nov. 4, 2010, 10 pages.
Office Action for U.S. Appl. No. 11/964,798, dated Oct. 14, 2010, 9 pages.
Office Action for Chinese Patent Application Serial No. 200780027461.6, dated Mar. 17, 2010, 14 pages.
Office Action for Chinese Patent Application Serial No. 200780027461.6, dated Aug. 31, 2010, 12 pages.
Office Action for U.S. Appl. No. 11/964,090, dated Aug. 31, 2010, 7 pages.
Office Action for U.S. Appl. No. 11/964,134, dated Aug. 25, 2010, 10 pages.
Office Action for U.S. Appl. No. 11/964,263, dated Sep. 16, 2010, 7 pages.
Office Action for U.S. Appl. No. 12/041,727, dated Aug. 31, 2010, 7 pages.
Office Action for U.S. Appl. No. 12/045,184, dated Aug. 13, 2010, 8 pages.
Office Action for U.S. Appl. No. 11/964,765, dated Sep. 30, 2010, 9 pages.
Office Action for U.S. Appl. No. 12/045,822, dated Sep. 29, 2010, 13 pages.
Office Action for U.S. Appl. No. 12/041,751, dated Oct. 7, 2010, 10 pages.
Office Action for U.S. Appl. No. 12/045,809, dated Sep. 28, 2010, 14 pages.
Office Action for U.S. Appl. No. 12/045,809, dated Sep. 28, 2010, 14 pages.
"Announcing the New Pocket PC 2002", http://web.archive.org/web/20020124155709/http:/www.microsoft.com/mobile/pocketpc/pocketpc2002/default.asp, 2002, 1 page.
Coats et al., "Streaming into the Future: Music and Video Online", *Loyola of Los Angeles Entertainment Law Review*, Jul. 6, 2000, 24 pages.
"Microsoft Developers-Code with Microsoft", http://msdn.microsoft.com/en-us/default(printer).aspx, printed on Nov. 30, 2010, 2 pages.
Olaru et al., "Speculative TCP Connection Admission Using Connection Migration in Cluster-Based Services", 2004, 8 pages.
"Pocket Outlook-Windows Mobile™ Software for Pocket PC", 2002, 46 pages.
"Tablet Personal Computer", http://en.wikipedia.org/wiki/Tablet_PC, printed on Nov. 30, 2010, 11 pages.
Office Action for U.S. Appl. No. 12/045,809, dated Sep. 28, 2010, 14 pages.

* cited by examiner

1002. Devices are linked by wireless connections.

1004. Device A seeks a copy of File X.

1006. Device B has compiled and stored an Index File, listing the files that are available for sharing by all other devices in its network.

1008. Device A sends an inquiry about File X to Device B.

1010. Device B informs Device A that Devices C, D and E all have copies of File X.

1012. Device A initiates connections to Devices C, D and E, and begins downloading the file from each in a multi-threaded fashion, downloading different parts of File X from each, tagged to indicate where the piece belongs in File X.

1014. Optimization software in Device A analyzes the speed of transfer and connection quality (e.g. maximum upload throughput) of the transfers from Devices C, D and E.

1016. The optimization software adjusts to optimize download performance (e.g. drops connection to Device D due to poor upload performance.)

1018. Software in Device A assembles the pieces of File X into one integrated complete copy of File X.

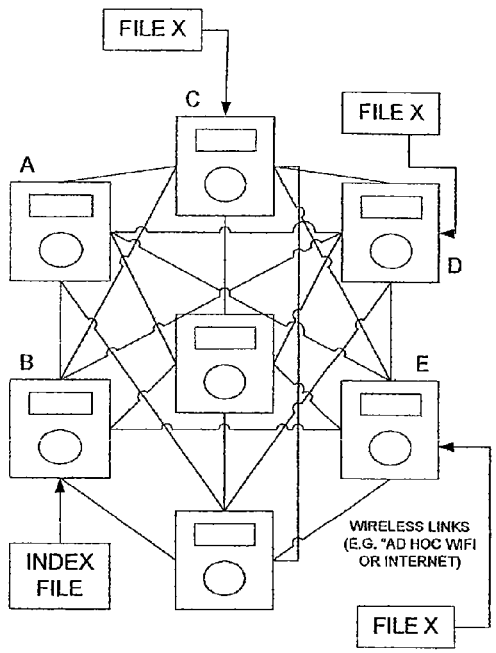

FIG. 1F

AUDIO VISUAL PLAYER APPARATUS AND SYSTEM AND METHOD OF CONTENT DISTRIBUTION USING THE SAME

CROSS-REFERENCE TO RELATED APPLICATIONS

This application is a divisional of application Ser. No. 11/780,535 filed Jul. 20, 2007, which claims priority to provisional application Ser. No. 60/807,840 filed Jul. 20, 2006, and Ser. No. 60/943,675 filed Jun. 13, 2007 and is a continuation-in-part application of application Ser. No. 10/953,746 filed Sep. 29, 2004, all incorporated herein by reference.

BACKGROUND OF THE INVENTION a. Field of Invention

The present invention relates to the field of digital audio and video player devices that are preferably portable and receive content either from a secure subscription-based service, "a-la-carte" content delivery service, or from other participant devices, and more particularly to a portable player apparatus that is in wireless communications with an Internet-based file server and/or to a peer player apparatus, at least periodically. The present invention also relates to a system and method for delivery and management of such content to such devices, and improvements thereto.

b. Description of the Prior Art

The development of compressed digital audio and video formats, such as the Motion Picture Experts Group-Layer 3 (MP3) audio compression standard, Advanced Audio Coding (AAC), Adaptive Transform Acoustic Coding (ATRAC), Windows Media Audio (WMA), Free Lossless Audio Codec (FLAC), Ogg-Vorbis and others enabled the growth in popularity of recording, storing, transferring, and playing back digital audio and video data on computers, including personal desktop and laptop computers. In particular, compressed digital audio and video formats enabled more efficient storage and transmission of high-quality audio and video content by reducing the amount of digital data that needed to be stored and transmitted, resulting in data files that could be smaller than $\frac{1}{10}$th of the original uncompressed digital file without unacceptably degrading the quality of the output. However, due to computational requirements, consumers were generally only able to access and use compressed and uncompressed digital audio and video on their personal laptop and desktop computers (except for conventional commercially-sold pre-recorded CDs and DVDs, which were playable on standard players connected to home stereos and the like). This severely limited portable use and access to such digital audio and video content in that it required the user to be present at or near his or her computer to see and/or hear the playback, which typically could only be through speakers and/or a screen internal to or connected to the computer and not easily transported in digital format to more favorable listening environments, such as the user's car.

More recently, relatively low-cost, lightweight, compact, portable digital media players (DMPs) have been developed, e.g., Thomson/RCA's various Lyra-branded products, Apple's iPod products, and Creative Lab's Zen line of portable MP3 player products. These portable devices enable consumers to transfer compressed digital audio and/or video files stored on their computers to the portable devices through the use of associated computer-based software via an external connection, such as a USB or "FireWire" cable, and to play the corresponding media on-demand through their DMPs while not in proximity to their computer. Users most commonly accessed the audio on the device by connecting headphones via a standard jack on the device, although it was also possible to connect a line-out cable to other audio output or recording devices, such as a microphone or line-input of a standard home stereo system.

Such DMPs originally tended to rely on the use of flash memory, such as compact flash or secure digital, for the storage of audio content, and were capable of holding a maximum of approximately 0.5 to 1 gigabyte of memory (and more recently 2, 4, 6 and 8 GB or more). So-called "portable jukeboxes" have also been introduced that can hold an estimated 10,000 songs or more of musical entertainment by including a miniature hard disk recorder in the housing of the device, which can have 40 gigabytes or more of capacity. Portable video players with even greater hard disk capacity have also been developed.

In general, conventional DMPs are capable of allowing their users to (1) transfer compressed media files from a computer to the device through the use of associated transfer management software installed on the computer and a physical connection to the computer, such as a USB cable; (2) store such compressed media files in non-destructive memory; (3) decode for playback any of a variety of compression algorithms; (4) convert a compressed or uncompressed digital file to an analog format, potentially also processing the signal to enhance the resulting sound and images; (5) process and amplify the resulting analog signal; and (6) produce high-fidelity sound and video for the user, which may be played, paused, fast-forwarded, rewound, skipped or replayed instantly and on-demand. Also, typically in the case of audio DMPs (e.g., the iPod "Nano"), the devices feature a relatively small digital display window that provides information regarding the audio content stored on the device, such as the title and artist, and enables viewing (and in some cases modifying) the sequence of the audio tracks that are currently stored on the device.

Disadvantageously, however, data transfer and advanced sorting and sequencing of selections are difficult or impossible for a user to accomplish unless the DMP is connected to the computer, which does not allow the user to obtain new content or to make other desirable modifications to the content stored on the DMP, such as easily modifying the sequence of the content selections stored on the device while the player device is not connected to the computer. Further, in the case of audio, these players typically do not enable a non-technical user to create and manage custom "playlists" (i.e., fixed song sequences), such that a user can easily develop and use a variety of personalized playlists for use at different times. Also disadvantageously, the display and user interface on these audio devices is typically limited in size, involves the use of multi-functional buttons which are complex for many users and is not touch-sensitive, thereby preventing non-expert users from easily viewing and modifying the listing and sequence of audio tracks stored on the DMP.

A further disadvantage of the prior art is that users are typically required to select content selections one-by-one and then to add them to the device. This requirement creates an inconvenience for the user since typically the user may prefer variety in programming and in many cases may not want to create a selection-by-selection sequence of entertainment, especially in the case of music. Programmed entertainment of this sort is currently available to consumers through traditional broadcast media and through other means that generally require the use of a device connected to a wired input, such as Internet-based streaming, accessible through laptop and desktop computers (and certain specialized wired devices, such as the Streamium audio device made by Royal Philips Electronics, or Sonos digital audio products), and digital cable television and radio services, accessible through cable-connected television sets. More recently, subscription-based commercial satellite broadcast services have been introduced, such as DirecTV for television and Sirius and XM for radio, which enable consumers to receive broadcast programming by selecting among available stations.

However, in all cases involving terrestrial and satellite broadcasts, the user does not have true on-demand access to a large library (e.g., 2 or 3 million items) of content, along with full transport control over pausing, skipping, repeating, fast-forwarding, rewinding and deleting content. Also, neither terrestrial and satellite broadcasts, nor Internet-based media services, allow the user to call up and access specific new selections on-demand on a portable device (which is preferably pocket-sized) that does not have full PC functionality (e.g., a laptop) and is not connected to an Internet connection. Accordingly, for the convenience of receiving programming with existing DMPs, the user is required to cede control over delivered content for convenience, or will be required to choose to cede convenience for control. Further, in the case of radio-linked audio player devices, player device reception is typically limited due to physical terrain and geographic features, which can distort radio signals that in all cases need to be continuously present and stable during the audio output to provide the user with a satisfactory entertainment experience. Further, of the forms of media services (e.g., TV and radio) available, only Internet-based streaming and digital cable, each of which require the user to use a stationary wired-device for access (e.g., television set and digital cable decoding box), and satellite broadcasts, which do not permit on-demand access or control by the user, provide digital-quality output, which may be a benefit required by users. The foregoing is partially mitigated by the development of consumer devices that permit digital recording of broadcast content by the end user. However, these devices generally have certain limitations: (1) The devices can store the digital content locally only when it is broadcast, requiring the user to wait for the broadcast to occur, and offering no opportunity for the user to access a missed broadcast. (2) In the case of music in particular, copyright and related laws limit the ability of these devices that receive broadcasts to be legally manufactured and marketed to consumers without explicit content owner approval, if such devices enable the user to exert a significant amount of control over the content playback and management, such as the ability to rewind or repeat a recording of broadcast satellite radio, or enable users to predict with certainty that particular copyrighted music will be broadcast at a particular time to enable the user to capture a digital recording.

A further disadvantage of the prior art is that a security method is not provided for content owners to enable distribution of content to users, management of the content and deletion/expiration of their content on a subscription basis using only a standalone DMP that is not reliant on the use of associated desktop or laptop computer software, while still maintaining royalty records and rights, especially against secondary party transfers. Content owners and users would also benefit from a way content can be shared laterally across peer-to-peer device transfers to other users of both the personal playlists and the media data content that may be stored in the player device in a way that is secure and that permits only authorized sharing activities. It can be appreciated by one having ordinary skill in the art that the terms "audio", "video", "media", and words of similar import may be used interchangeably throughout this document to describe the relevant content, since methods of digital video content compression, storage, transfer, playback and control can be accomplished by using very similar methods and technologies and are similarly well-known by those skilled in the art. Note that "content," as used in this document, shall accordingly mean any audio or video recording that a user may seek to access, and also shall include any other file type capable of being interpreted by a user, such as a written document stored in digital form or a digitally stored and compressed photograph, which may be similarly transferred, shared and used.

An apparatus and system that solves many of the problems associated with the prior art has been previously filed as application Ser. No. 10/953,746 incorporated herein by reference. The present invention addresses additional issues and improvements to the previously described system.

SUMMARY OF THE DEVICE DISCLOSED IN THE PARENT APPLICATION

A preferred embodiment of the device disclosed in the '746 application consists of a portable wireless audio and/or video player apparatus (which is preferably pocket-sized) having one or more of the following elements: a peer-to-peer audio and/or video data transfer module to allow communications with another wireless audio and/or video player apparatus; a wireless communication link to an Internet-connected base, a communication software module for requesting one or more audio and/or video data files from an Internet-based database server via the Internet-connected base station; a first security means for enabling the downloading and storage of the requested files; a second security means for the management and playing of the stored files; and one or more software modules for interfacing with a user to effect the foregoing features using an easy-to-understand interface. More specifically, the player apparatus is able to function as a standalone device to generate, search and obtain new audio and/or video digital data files (containing content and associated metadata (as defined below)) wirelessly over the Internet, without the need to use an intervening device, such as a desktop or laptop computer that temporarily stores the content data files to be transferred to the portable device, or software that runs on a laptop or desktop computer to manage the transfer and arrangement of content on the portable device. This feature enables a non-technical user to access and use digital audio and/or video content without bother or knowledge of how to operate a traditional PC computer. Further, to overcome the limitations of the display interface of the prior art, the user interface software according to embodiments of the present invention is designed to enable more complex user functions and data organization, and to display these simply and clearly. Such user interface software permits the device to reasonably and comfortably function for the user as a standalone device while permitting the user to search for new content, manage and modify large volumes of content, and share content across a large number of potential users who may be listed by user ID or name. Moreover, the device obtains files from a server or laterally from another device without using a browser-type application.

It is also a feature of the embodiments of the previous device to provide the user with a flexible programming capability both as to time and selection for the playing of the individual audio and/or video files or groups of files. This includes allowing a user to select and play individual content selections from a broad content library stored in a network on-demand, and alternatively to request that hours of continuous programmed content be playable on demand, which programming will be updated on a periodic basis (e.g., daily), without limiting the user's ability to start, stop, rewind or fast-forward through the program. The service operator would be able to set, control and enforce the applicable user access rules based upon desired legal and/or contractual constraints and business objectives.

It is also a feature of the embodiments of the previous device to provide a means for exporting the data content to one or more of a plurality of output devices, including headphones or a home or car stereo, or another storage and/or playback apparatus such as a desktop or laptop computer. Such export may be via either a wired or a wireless communications link.

It is a feature of the embodiments of the previous device to provide a portable player apparatus that is not dependent on favorable physical terrain and geographic features that are typically associated with wireless communications devices. This is mainly accomplished by the pre-storing of desired audio and/or video data and metadata content while in the presence of a communications uplink for accessing/playing at a later time, at which time a continuous wireless connection is not required for navigating the metadata database or for a satisfactory output of the stored audio and/or video content.

It is a feature of the embodiments of the previous device to provide a secure method for content owners to enable distribution of their audio and/or video content to mass-market consumers on a subscription basis.

In a preferred embodiment according to the previous device, a media distribution system preferably consists of a broadband network system for wirelessly distributing digital media files to multiple standalone portable digital media player devices in which the devices are: (1) optimized for searching for, receiving and playing audio and/or video files, authorized obtainment from a network or peer device, management and search of metadata and media content (even while no network or Internet connection is present), authorized playback and authorized transfer (such as to a peer device or digital computer) of digital audio and/or video files by a user; (2) capable of wirelessly transmitting and receiving audio and/or video data files at "broadband" speeds via conventional broadband protocols, such as that promulgated in the 802.11x standards, both to and from a network which preferably includes Internet connectivity; and (3) able to communicate with an application service in order to request and download encrypted audio and/or video content and associated metadata. Each portable player device preferably includes at least a first security means that disables playback and transfer of media files, or that selectively enables such playback and transfer when a subscription service is activated. The media distribution system preferably includes one or more Internet-based database servers wherein are stored digital audio and/or video data content in compressed or uncompressed form and associated metadata (i.e., descriptive or associative data concerning the content—in the case of audio, this may include such items as length of track, name of artist, name of song, name of album, encoding format and bit rate), an Internet application server interface that communicates individually with each portable device via a secure certification/authentication link, an upload manager that ensures the secure and efficient delivery of data content files to each of the portable devices, and the communications network, thereby allowing the user to request, download, and store individual titles, groups of titles, and/or preprogrammed entertainment that fit particular criteria (such as genre or purpose (e.g., work-out, dancing)) on a periodic basis.

The audio and/or video content may be distributed to the portable player devices in encrypted form, capable of being played only when decrypted with a particular private digital decryption key. The portable player device (or apparatus) is preferably constructed with an internal clock that is not settable or re-settable by the user (which is a necessary part of preventing a user from avoiding the expiration and disablement of content for time-based subscriptions), but rather can only be digitally set by establishing a secure and authenticated connection to a secure subscriber network that provides it with accurate time and date information. The portable player device preferably also includes a monitoring module that records the time and date each time a content selection is played or transferred by the device. The monitoring module also preferably includes a reporting module for transferring the monitoring results to the network (e.g., via the device's upload manager) when connection is made between the portable player device and the network for any reason. The portable player device further preferably contains software (supported by secure hardware configuration) which enforces conditional access to the decryption key by the playback mechanism, which conditions are preferably set by, and updateable by, the server-side operator and might include ensuring a user is a current and valid subscriber to a content service, or a play count limit has not been exceeded (other example conditions enforced by mechanisms on the player device, as opposed to the server, might include detecting whether the DRM or security mechanisms have been tampered with).

In a second embodiment of the previous device, a portable peer-to-peer wireless communication player device for transferring audio and/or video and related files to and from a second portable peer-to-peer wireless communication player device, the portable peer-to-peer wireless communication player device preferably comprises: a wireless transceiver unit for wirelessly communicating with external devices (such as peer devices and digital computers); an audio output unit for playing audio files; a visual output unit for displaying video and/or displaying user interface information (e.g., LCD screen or other existing or hereafter created output technology, which, in the case of user interface information, may also be replaced (as is familiar to those experienced in the art) with a menu-driven audio output means); a controlling computing unit having a user input interface and a microprocessor; a digital storage means for storing digital data; and an included software method for operating the device, wherein the digital data preferably includes audio and/or video data content and playlists. Further, the audio output unit preferably includes one or more from the group consisting of speakers and headphones, and the user input unit may consist of one or more from the group consisting of buttons, keys, joysticks, toggles, switches, keyboards, touch-pads and touch-sensitive screen locations, which may include infrared, resistive, inductive and capacitive sensing means. The software may include one or more of the following modules: a communications module; a processing module; a security module; a user interface module; a resident database management module; a storage and retrieval module; and a play module.

The user input interface of the second embodiment preferably includes a set of interactive screens displayed on the video output device, further including: the steps required for selection of one or more titles in response to screen display pages in order to generate a content request list for transmitting to the audio and/or video content distribution center upload manager and database. The security module preferably includes means for interaction with upstream base station to enable the operation of the portable peer-to-peer wireless communication player device; interaction with at least one second portable peer-to-peer wireless communication player device; and expiration of audio and video content files according to a set of subscription and usage rules that may be modified through programmed changes at the network/server level. Such rules may include, for example, prohibition on playing any subscription-based content resident on the portable device unless the network has authenticated and validated the subscription on the device within the past 30 days.

In a third embodiment, a portable peer-to-peer wireless communication player device for generating and wirelessly transmitting a playlist to local base station having an Internet connection to an Internet-based database server, and receiving an associated plurality of audio and/or video data content files, preferably comprises: a portable peer-to-peer wireless communication player device as in the second embodiment communicatively coupled to an Internet-based database server via a local wireless base station. In the third embodiment, the wireless communications are preferably accomplished using a WiFi protocol (or variant, such as Wi-Max). The internet-based database server: distributes stored audio and/or video content files in response to playlist transmission request after first verifying that the requesting device has an authorized subscription; sends re-enabling messages to the requesting device to reset a local security module to generate a first enabling action; sends disabling messages to the requesting device to cause the local security module to generate a disabling action if the device does not have an authorized subscription.

In a fourth embodiment, a secure subscription-protected communications system for distributing audio and/or video data content to a portable peer-to-peer wireless communication player device, preferably comprises: 1) a portable peer-to-peer wireless communication player device that generates a content request list via an interactive user interface or by automatically determining a list of one or more selections the user desires but which are not currently stored on the device (e.g., based on a preferred sequence of songs or videos the user has compiled (a "playlist"), only some of which are currently stored on the portable device); transmits the content request list to a local base station; receives and stores associated audio and/or video files transmitted from the local base station; transmits to and receives from, on-demand or in an automated fashion, content files from other peer-to-peer devices; displays a list of available content on the device to its user, as well as to other users who establish a wireless connection with the device; displays a list of possible content choices, even if not resident on the device, to the user; enables management of a large quantity of digital content, including the development and modification of custom playlists; plays audio and/or video files in response to user selection, if the subscription is valid; and disables content rendering if the subscription is invalid, such that the user is not able to play the content on the device; 2) the local base station receiver that receives the content request from the peer-to-peer portable wireless communication player device; and transmits the received request to an Internet-based database server via the Internet communication link; 3) the Internet-based database server that: stores and manages a plurality of audio and/or video files that are accessible by inputting associated titles or file IDs; tracks subscription information (e.g., such as access rights and expiration timing) for a plurality of portable peer-to-peer wireless communication player devices; tracks artist proprietary material and rights; tracks usage of proprietary material on each one of the portable peer-to-peer wireless communication devices; receives the content request list from the local base station via an Internet communications connection; retrieves selected audio and/or video files indicated by the received playlist; transmits the selected audio and/or video files to the local base station for re-transmission to the portable peer-to-peer wireless communication player device; and 4) a local base station transmitter that receives transmitted audio and/or video files from an upstream database server via the Internet communication link and re-transmits the received audio and video files to the requesting portable peer-to-peer wireless communication player device.

In a fifth embodiment, a secure subscription-protected media distribution system for distributing audio and/or video content files to a portable peer-to-peer wireless communication player device in response to a received playlist, preferably comprises: 1) a peer-to-peer wireless communication device that: generates a user content request list via an interactive user interface (or in an automated fashion based on user preferences that the user pre-selects, and/or a predetermined set of rules or other criteria); transmits the generated request list to a local base station; receives and stores associated audio and/or video files transmitted from the local base station; plays audio and/or video files in response to user selection, if subscription is valid; and disables and/or expunges content if the subscription is invalid; 2) the local base station receiver that receives requests from the portable peer-to-peer wireless communication player device and transmits the received requests to a database server via the Internet communication link; 3) the database server that: stores and manages a plurality of audio and/or video files that are accessible by inputting associated titles or file IDs; tracks subscription information for a plurality of portable peer-to-peer wireless communication player devices; tracks artist proprietary material and rights; tracks usage of proprietary material on each one of the plurality of portable peer-to-peer wireless communication devices; receives the content request list from the local base station via an Internet communications connection; retrieves selected audio and/or video files indicated by the received playlist; and transmits the selected audio and/or video files to the local base station for re-transmission to the portable peer-to-peer wireless communication player device; and 4) a local base station transmitter that receives transmitted audio and video files from upstream database server via the Internet communication link and re-transmits the received audio and/or video files to the requesting portable peer-to-peer wireless communication player device.

In a sixth embodiment, a wireless communications system for selecting, downloading and playing audio and/or video data content using a wireless protocol which, in the present embodiment may be based upon the 802.1x (or similar) standards and related technologies (referred to herein, along with other wireless technologies now existing or hereafter developed (such as Wi-MAX) which may be substituted, as "WiFi"), preferably comprises: a subscription-based database server further including: a first Internet connection; a plurality of audio and/or video data content files; and a translation and retrieval means for defining and downloading a unique one of the audio and/or video data content files in response to an inputted title or file ID selection request. The wireless communications system also preferably includes: a local WiFi base station, which has a second Internet connection in communication with the first Internet connection; and a portable wireless communication subscription-capable player device, which further includes: a selection means for generating at least one title or file ID selection request; and a WiFi transmission means for transmitting the first title selection request to the local base station and thence to the database server; a WiFi receiving means for receiving the audio and/or video data content file downloaded in response to the transmitted title selection request; and a playing means for playing the downloaded audio and/or video data content file.

The portable wireless communication subscription-capable player device of the sixth embodiment preferably further includes a security unit for controlling the operation of the unit in responsiveness to at least one subscription status indicator. The selection means of the portable wireless communication subscriber player device may further include a display unit and a user input means, which may further include such input devices as a button, a touch-pad location on the display unit, a joystick, a toggle, a key, a keyboard or a voice recognition input means.

The portable wireless communication subscriber player device of the sixth embodiment preferably further includes a communication means for wirelessly connecting with a second portable wireless communication subscription-capable player device for the purpose of transferring data between the two devices using the WiFi protocol. The portable subscriber wireless communication subscription-capable player device preferably includes means for selecting, downloading and playing audio and/or video data content (or, per the definition of "content" herein, any other data files) using a WiFi protocol, comprising: a selection means for selecting at least one from a displayed list of audio and/or video titles and generating at least a first title selection request; and a WiFi transmission means for transmitting the first title selection request to a local base station and thence to a database server; a WiFi receiving means for receiving the audio and/or video data content file downloaded in response to the transmitted title selection request; and a playing means for playing the downloaded audio and/or video data content file. The portable wireless communication subscription-capable player device of the sixth embodiment preferably further includes a security unit for controlling the operation of the unit in response to at least one subscription status indicator.

DESCRIPTION OF THE DRAWINGS

FIG. 1F shows a combined flow chart and block diagram of an example pf a P2P file sharing protocol across wireless portable devices;

DETAILED DESCRIPTION OF THE INVENTION

Feature 1—Profile Selection Remote from the Portable Device

In the original system described in the parent application, the emphasis was on the portable device. The portable device was set up to allow a user to make all the changes in the user profile itself. However, in some instances, a user may prefer to make changes in his profile from a desktop or laptop computer because these latter devices have bigger screens and, generally, more full-functional interfaces—or another device, merely because the user has convenient access to the device at the time he/she wishes to make the changes. A system performing this function is shown in FIG. 1.

Figure 1:
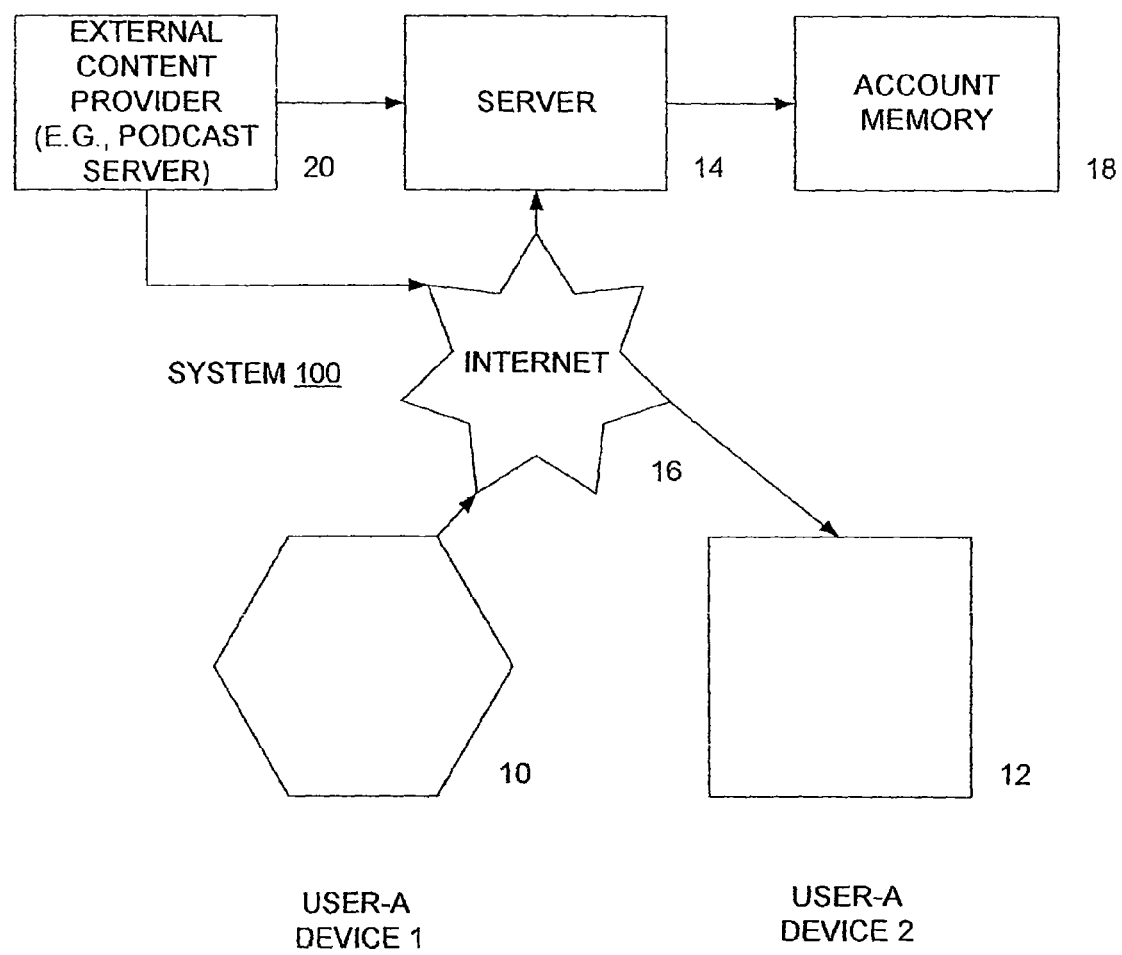
FIG. 1 shows a block diagram of a system with several devices owned or accessible to one or more users, with each user being able to set characteristics and other data associated with the devices.

In FIG. 1, a system 100 is shown in which a user owns, operates or has access to several different devices, two such devices labeled 10 and 12 being shown in the Figure. Each of the devices has access to a content server 14 over the Internet 16, using a wired or a wireless connection (e.g. WIFI) and with or without a browser. Through each device, the user can access his account on the server 14, using a user name, password, etc. Once he gains access to his account, the user can then make various changes, such as his address, telephone number, preferred credit card, etc. Moreover, the user can also make changes to his profile, including the genre of music he likes to hear, or can modify his lists of songs. In addition, the user can also modify various settings for any of the devices associated with his account.

For example, device 10 may be a desktop PC and device 12 may be a portable music player. The user can access the server from either device, as discussed, or change the personal information, profile information, etc. He can also check or change various settings on the portable music player from the desktop. For example, the player may have a privacy setting that stops other devices from accessing and downloading selections from the player. This privacy setting can be enabled remotely from the PC.

All the changes made by the user are entered on the user's account by the content server 14 and stored in an account memory or database 18. This process is preferably implemented using an Internet web-based thin client. The next time the user accesses his account using the portable player 12, the player automatically downloads the new settings, including the privacy setting, as well as other information relevant to its operation.

Feature 2—Remote Editing of a Portable Device Options

Another feature of the present invention is that, using for example, the system 100 of FIG. 1, the user can use on a device, such as device 10 to edit information on device 12. For this purpose, various lists and other data, such as addresses, telephone numbers, lists of songs that the user has downloaded and their arrangement, are all stored in the account memory or database. Other information and actual content is stored in this manner as well, including musical selections, such as songs, multimedia content files, e-mails, pictures, and so on.

While device 10 may be in contact with the content server 14 at all times, device 12 need not be. Once the user gains access to the server 10, he can make the changes to both the various lists as well as the files containing content as well. For, the user can change these lists, by arranging them, adding or deleting items from the lists, etc. Similarly, the user can rearrange the content in memory 18, or even delete the same as desired.

Figure 1A:
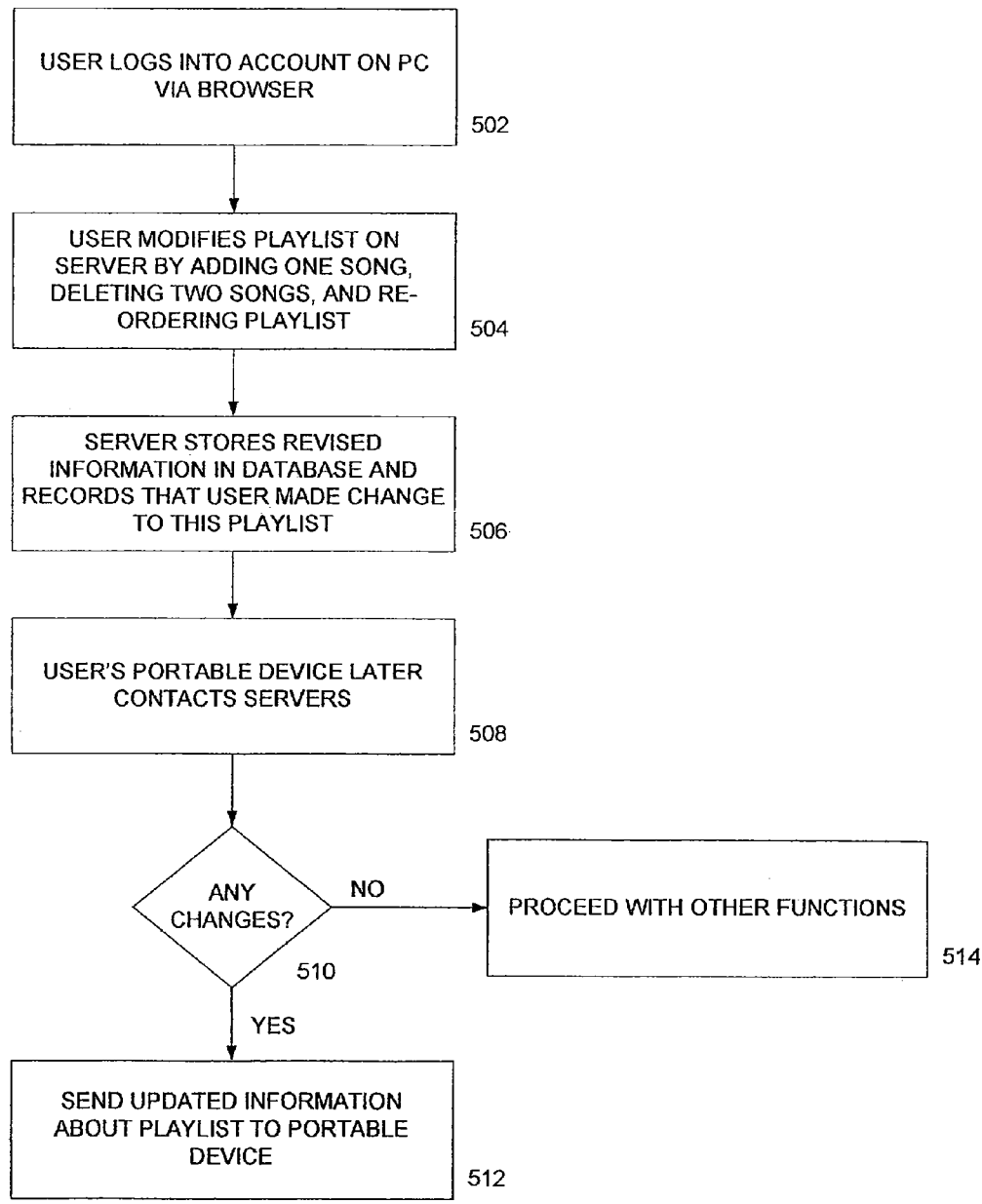
FIG. 1A shows examples of remote editing of a playlist.

Contact between each device, therefore, could be established continuously, sporadically, when Wi-Fi service is available, at regularly scheduled time, or when requested by the user. The next time, the user accesses the content server 14 with any of his devices, the information in the respective device is updated using a sync operation similar to the ones used in PDAs. This process can also occur automatically or when requested by the user. If the updating or sync occurs automatically, the user has the option of disabling it. This process can also allow users to send information (including text, audio, video, and other media) to other users. For example, one of user A's devices 10 can send information to user B's device 12 in a similar fashion, if desired. FIG. 1A shows an example flow chart for implementing these features. In FIG. 1A, the user can log into his account in step 502 and then modify his playlist in step 504, which is then stored on the server in the database in step 506. In step 508, the user's device later contacts the server. If any changes have been made (step 510), the updated playlist information is sent to the device in step 512. If not, the user can proceed with other device functions in step 514.

Features 3 and 4—Automatic Content Distribution and Podcasting

The present invention further provides a system for automatically distributing new content directly to end-user devices. Through the user interface of a portable or other device, a user indicates preferences for particular "Gremlists™" or "podcasts," or otherwise indicates preferences for other similar "push content" from the server via a user interface (collectively referred to herein as "podcast"), which may be presented to the user by content server 14 (as depicted in FIG. 1). Each such podcast may include the latest edition of an audiovisual program and any previous editions that the publisher may desire to make available (e.g., it may be a playlist of separate audiovisual programs). The user of a device of system 100 may sign up to one or more podcasts. The contents from the podcasts are then made available to devices 10 and 12 from digitized media files stored on content server 14 or 20 (which may be internal or external to the service provider) whenever the respective device contacts the server for an update and/or when the content server 14 sends a message to the devices that new content is available for downloading.

This may be implemented in multiple ways. First, the user can be given access to a selection of podcasts either via the portable wireless device 10 interface or via any other device 12, such as a PC with a browser. The user can select a podcast for his/her account by entering (or browsing) a URL manually or by searching or browsing an aggregation of available podcasts stored on the server 14 (which may be updated by the provider or by users from time to time)—this listing may be compiled by a server which aggregates available podcast content by periodically polling podcast URLs 20 and compiling and organizing the metadata. The listing of podcasts may be presented or made searchable/browseable by traditional means on a browser-based device. However, preferably, the list of available podcasts is also searchable and browseable (in addition to online live searches against a server) via an asynchronous catalog mechanism such as the one detailed in application '746. This would allow a user to review metadata and select podcasts for his/her account with low latency, even if the device was not presently connected to the Internet. Regardless, in all cases, for each podcast the user is given access to basic metadata fields, which at minimum include a podcast title and a listing of editions, but may also include short and long descriptions, descriptive podcast edition titles, authorship, year of publication, etc. The user can indicate a preference to subscribe or unsubscribe (or download any individual edition or group of editions) from any available interface.

In any event, through any of these available means the user indicates a preference for one or more such podcasts. The device itself then may remember these settings, such that it may directly download, for example, podcast content over Wi-Fi using a standard podcast protocol such as RSS XML or RDF XML and compatible software running on the device. (Preferably the system is designed so that the relatively large media files are always downloaded by user device 10 directly from the originating content server 20, and not proxied via an aggregator's server 14, which would cause inefficient bandwidth consumption.) Alternatively, a proprietary or modified protocol could be used. Regardless, though, preferably the server 14 would record the podcasts to which a user is subscribed in its account memory 18, such that a user who lost a device could have these settings restored to a new device easily. Other benefits are also made available—in particular, the user could make changes to his/her listing of desired podcasts and podcasts editions via any available access to the server 14 (e.g., a PC device 12 with a browser)—for example, subscribe to three new podcasts—and those changes would then be automatically reflected and sync'd to the user's main portable wireless device 10. Ultimately, in all cases, this affords the user of the portable wireless device to gain access to the latest published podcasts, which are conveniently and asynchronously downloaded over a wireless link to the user's device with minimal user action required, and the settings for which may be controlled from any available device with eventual access to the server 14.

The new content can but need not be DRM-protected. (If content is DRM-protected, the device would need compatible DRM decrypting software and would need a means to provide an appropriate challenge to the DRM server, including any necessary account or user authentication information.) A device (such as 10) can then be set to periodically connect to the server 14 during the times a network is available, and to automatically download new content from the subscribed podcasts, so they are available to the user without further user interaction. The new content can either overwrite the existing one or can be added to the earlier content and accumulated/appended, if desired. The user can be given the option to save any edition to a permanent collection (potentially for a fee, enforced by secure device software and/or the DRM usage rights associated with encrypted content), or preferably to have automated memory-management software delete old content as new content is downloaded and more space is required.

Advantageously, this feature is performed on a portable player and therefore the content can be obtained without a browser, and in an asynchronous manner not requiring an always-on connection (e.g., for a Wi-Fi or Wi-MAX device with on-the-go users). In particular, if RSS XML software is not available, a proprietary protocol, such as that used for "Gremlists™" push content downloading in the '746 application, could be used. Such a protocol would also have the benefit of insulating the device from changes to the RSS/RDF protocol over time used by the various providers, and to providing more security and control from a service aggregator's point of view. It also offers a more efficient transaction over the wireless link since a server can perform tasks in advance of a connection, such as aggregating a list of updates if the user is tracking many podcasts from multiple sources. Additionally, the design of this system is greatly beneficial where the service provider and operator of the aggregating server 14 desire greater control and seek to provide a more managed and fault-free experience for their supported mobile users, which may be driven by business and/or user experience objectives.

Feature 5 Advanced Peer-To-Peer Functions

As mentioned above, an advantage of the present system is that it has the ability to perform various peer-to-peer functionality on a Wi-Fi device/mobile phone/etc., e.g., hotlisting. Hotlisting may include a user creating a wish list of songs (or criteria for desired songs). The server monitors the hotlist of each its users, and when one of the songs is published or becomes available from a source (e.g., potentially another user in the same community), the server 14 obtains the song through normal channels and makes available to the respective device or devices, thereby fulfilling the wish list automatically.

Another aspect of the invention pertains to two devices provided with suitable means, such as wireless or other networks, connections, using advanced peer-to-peer protocols and functions. When the devices detect each other, they can exchange and share various data and content including buddy lists, hotlists, playlists, etc. The devices can be portable wireless devices, PCs, etc. If one of the devices is a portable device with a Wi-Fi chip, it can connect wirelessly to a network ("infrastructure mode")—for example, connecting to the Internet from a T-Mobile® hot spot. It also can connect to other (i.e., one or more) devices directly using Wi-Fi ("ad hoc mode").

For these purposes, software on the wireless device uses an algorithm for scanning available connections, preferring one connection above the others (using predetermined criteria). For example, the device can first seek to connect to the Internet through a WiFi access point with the strongest signal strength (in infrastructure mode), and if that is unavailable to automatically connect to other devices directly, wirelessly point-to-point (ad hoc mode). Other criteria may be used for selecting one device over others as well.

When connected to the Internet, the device (e.g., device 12) can show a list of other connected devices, either through a central server or through any of a variety of Internet peer-to-peer architectures. In either case, when the device connects to another device, the software can enable a number of automated features for the convenience of the user. For example, if the user is looking for a particular content file—such as a digital song or movie—the device automatically scans all available connections and, if the particular content file is found on another device (either through the Internet or point-to-point), the desired content is obtained from the other device. Software on the target devices provides a list of available content on that device automatically when another device contacts it.

Figure 1B:
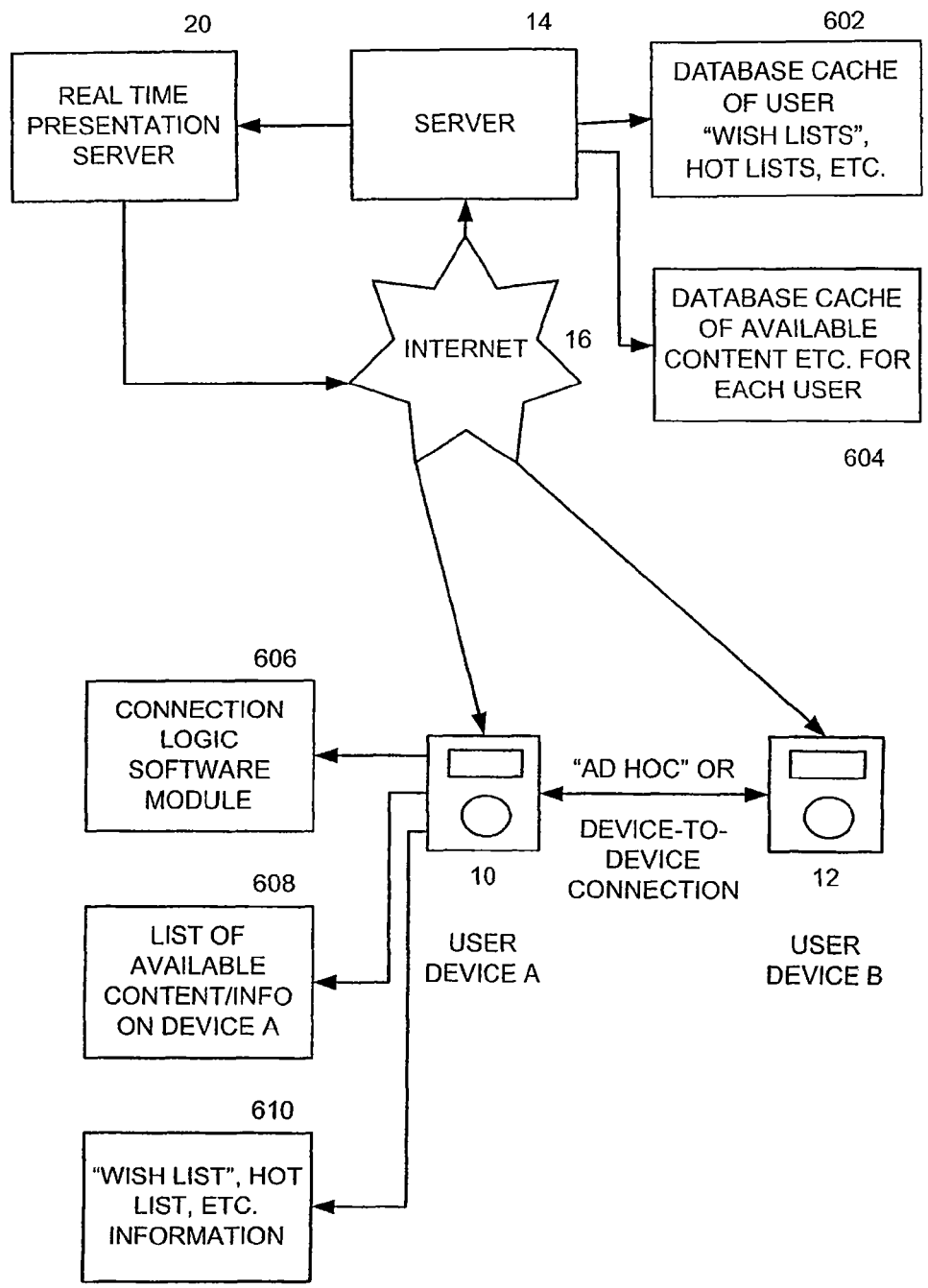
FIG. 1B shows a block diagram of a system implementing some advanced peer-to-peer features.

The device can also show additional information. It can also show information about the other users' status, such as, for example, showing on a wireless portable digital music player the current playing song on that player (which may optionally be developed so as to update in real time). The software also enables devices to beam or otherwise exchange content and other information, including songs, photos, videos, preferences, lists, text, etc., through the wireless connections (provided of course that these are allowed by the DRM rules of the respective content). Typically this feature is accomplished by sending a message to a target device and giving the target device the option to download content from the sender (or, alternatively, from a central source of the content, such as a commercial digital content distribution service on the Internet). In an alternate embodiment, once a device knows what is on the other, the data can be exchanged either directly (if both devices are online simultaneously), or if the recipient is off, the sender can transmit the data to the content server 14. The server 14 then stores this information in a database until it can be transmitted to the recipient when the recipient comes online. (Note "transmitting" can occur in all cases via the recipient device "asking for" and "pulling" the desired content, in a client-server like fashion.) FIG. 1B shows a block diagram of a system for implementing these features. For this purpose, the user device 10 includes a connection logic software module 606, a list of available content module 608 and wish list or hot list module 610. The server 14 is associated with a data base cache of the various user wish lists, hot lists, etc, (602) and a database of available content 604 for performing the processes described above.

Feature 6—Organization of Available Content in a Catalog

As mentioned above, one of the features of the present invention pertains to the manipulation of various lists on the devices. One aspect of this feature is the organization of large lists (e.g., >50,000 items, or millions). Each list is arranged into multiple layers and sub layers. For music, each layer identifies a group of songs, for example by the first word of the title. The successive sublayers then include all the songs containing or starting off with said first word. If various editions of the same song are listed, then various types of metadata (using, e.g., the artist, the length of the song, the date on which it was released, etc.) are then used to differentiate the songs with the same title. This feature is advantageous because it renders the list arranged in this manner to be easily searchable, even on the small screen of a portable player. In particular, users can easily and meaningfully distinguish versions of the same song from one another on a small display (e.g., when the identical song having the same title is released by the same artist on 2 different albums).

One new feature of the invention is the manner in which songs from a list are loaded. Initially, a list is created of the songs that are to be downloaded into the portable player. This list may consist of individual entries from the user or a completed list entered as a file by the user. The list can also be generated automatically based on the preferences of the user, or downloaded automatically from the server or other users.

Figure 2:
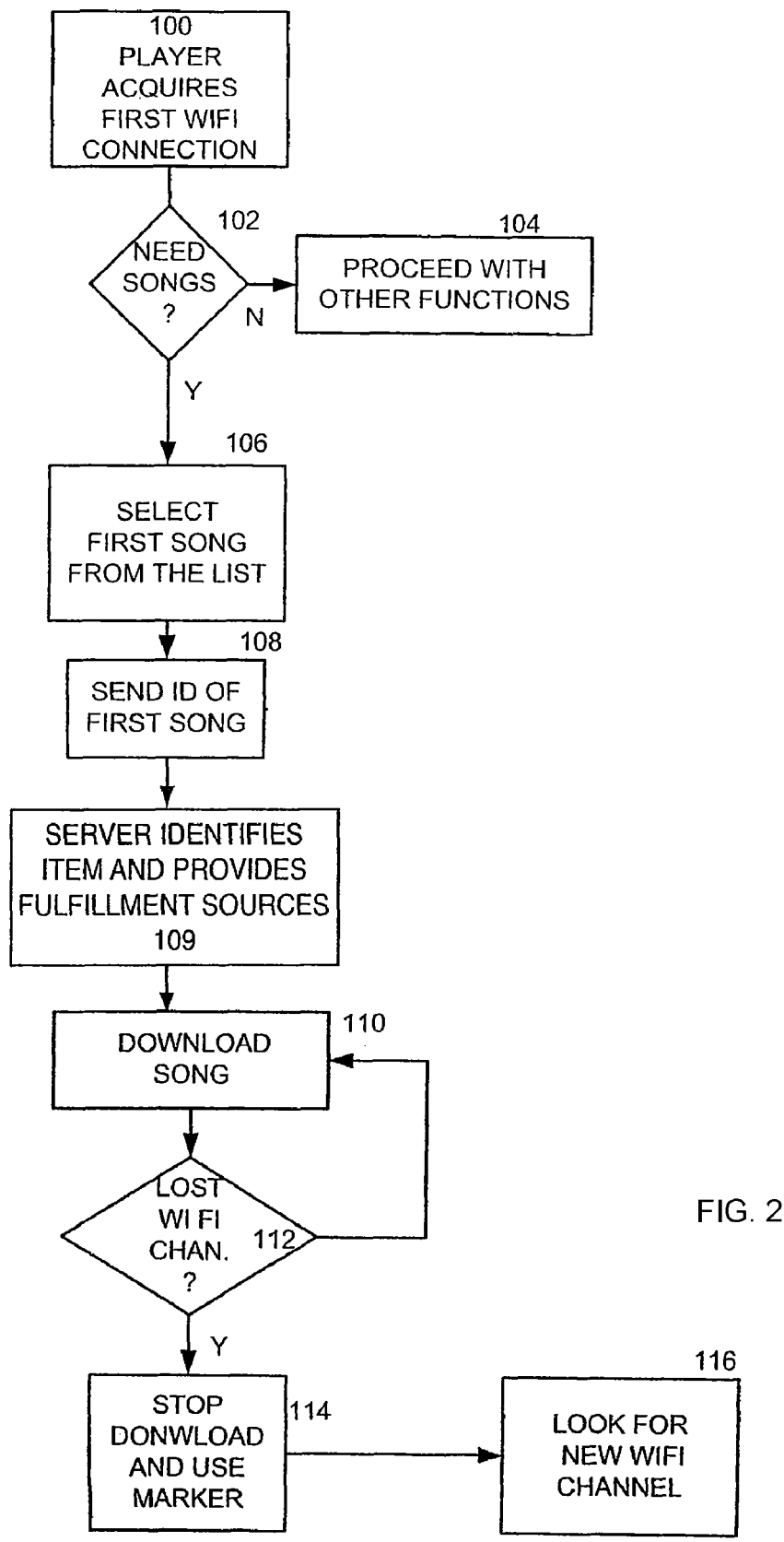
FIG. 2 shows a flow chart for downloading content on a portable device sequentially from several sources.

Once a new list is downloaded into a player, or an existing list is updated, then the corresponding songs identified by the list are downloaded into the player. A flow chart implementing this concept is shown in FIG. 2. In step 100, a player acquires a channel to a server (or other devices) through a Wi-Fi connection. In step 102 the player determines if it has a new or incomplete list of songs that have not been loaded into the player yet. If it does not, then the player continues with other functions in step 104, including any of the functions described above. If there are songs to be downloaded, then in step 106 the first song to be downloaded is selected. In step 108 the ID of the song is transmitted to the server. (Alternatively, the system can be constructed such that the server dictates the ID of the song(s) to be downloaded). In step 109 the server validates the request and determines one or more available locations (such as a URL on an external content server 302) from which the request can be fulfilled, and makes this information available to the device 12.

In step 110 the process of downloading the selected song is started. During the downloading process the channel to the server is monitored. If the channel is still opened, the process continues. If the channel is interrupted then in step 112 the download process is halted and a marker is used to indicate what portion, or how much of the song has been successfully downloaded in step 114. In step 116, the player then looks for a new WiFi channel. When a channel is established with a new (or the previous) server, the downloading of the song continues at the point indicated by the marker.

In the description provided above, it was assumed that the song is being downloaded from a server through the Internet. Of course, as discussed previously, the source for the song may be another player.

The lists of songs for each player can be generated in a number of different ways. According to one feature of the invention, a recommended list is generated by the server, using various techniques, including using preferences of the user, monitoring the songs selected by the user, monitoring songs selected by a group of users having similar profiles and interests, etc.

A person downloads (or collects on the server) a large number of songs over a period of time. Because of this lag, the collection of songs may include apparently duplicate entries. These entries may include actual duplicates, or more copies of the same song, different versions of the same song (the versions differing by the orchestra and/or artists, instrumentation, etc.) or may be two different songs that merely share the same title but otherwise are completely different. Therefore, in the present invention, a catalog is created of all the songs in a collection, by title, artist, producer or by using other criteria. Songs with apparent duplicates are marked with a specific symbol, such as an asterisk. For example, this additional information may include a listing of all the duplicates with an entry for each duplicate indicating the artist and album, and/or other information. Preferably, the generation of the catalog of song entries and the indexing of all the songs used for generating the catalog is performed by the server. When a user selects a song with this symbol, a secondary window is presented with additional information that will enable the user to determine what kind of duplicate is being stored. This process allows the user to select and play a selected song quickly and easily even if duplicates are present.

The process of displaying a catalog of songs can be used to allow a user to make a selection quickly and easily while minimizing computational time, especially in the hand-held device.

Figure 1C:
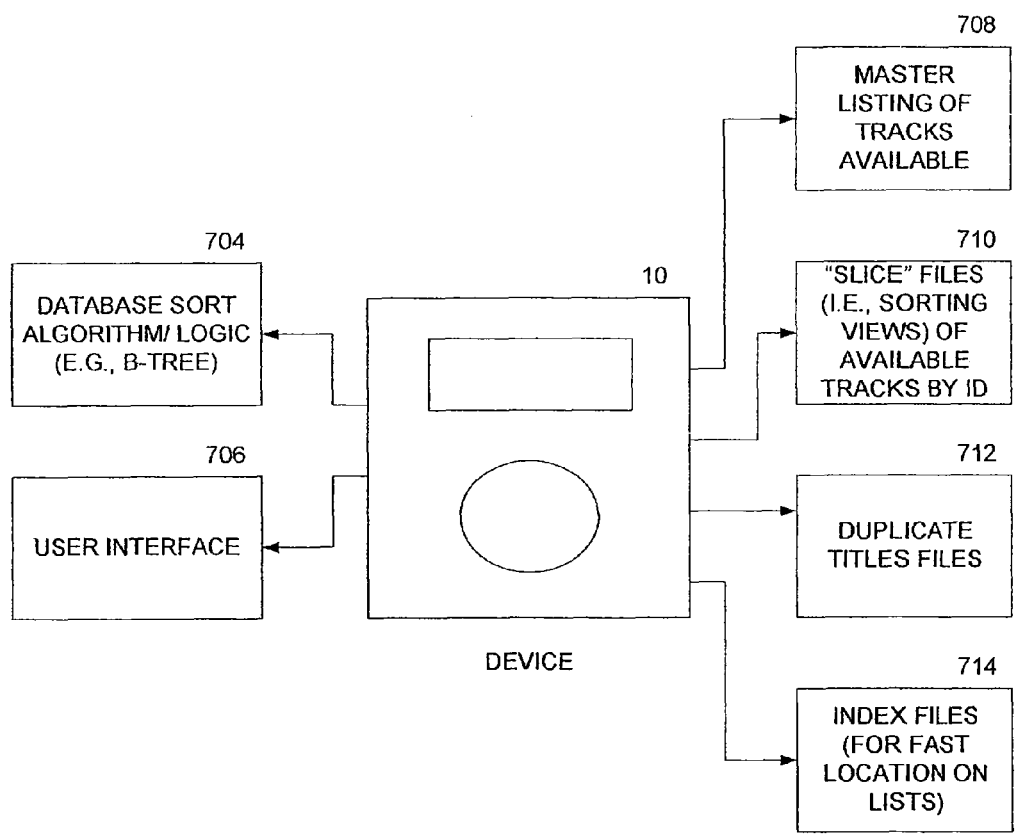
FIG. 1C shows a block diagram for the device 10 adapted to process catalog lists.

The songs available from a content provider are arranged in a master database. This master database can be searched using any criteria, such as artist, title, album, genre, release date, and so on, using a known sorting program. Each sort requires the server to send a sorted list of IDs, reducing the required processing by the device to save on battery power and reduce latency. The server prepares the data in a way that other attributes can be quickly and easily shown to a user. For example, when an artist is found and albums are displayed, they are displayed in alphabetical order to make it easy to find a particular album. Albums that are most recently released by the artist are highlighted in bold or otherwise flagged for the user, so that the user can also quickly see the most relevant and current material. Other indicators can be sent in a similar manner, such as data on "most popular" releases. A block diagram of device 10 showing elements required for handling lists in a catalog is shown in FIG. 1C. The elements are a logic database 704, a user interface 706, a master listing of tracks available 708, a sorted view of available tracks ("slice" files) 710, a file of duplicate titles 712, and an index of the files 714.

Feature 7—Handling New Lists

Once a recommended list is generated, the server presents this list to the user. The user has the option to download the whole list or select and listen to any or all the songs on the list. He can also receive only representative clips from the list. Of course, all the other rules for buying/playing/etc. songs are followed, including any DRM (Digital Rights Management) or other security rules. These rules may be require that the songs be copied only a predetermined number of times, during a predetermined time period, etc. If the user creates a playlist, or obtains a playlist from another source (e.g., another user's device or his computer), or some other way, and the playlist refers to songs that are not currently stored on the player, the player then automatically identifies those songs and searches through its wireless and wired connections to either other devices and servers, direct point-to-point or through a network. If the device finds a song that is on the playlist, it will download it (in parts if necessary) from the first (or, preferably, best—such as one or more sources offering faster speed) available source, and will alert the user when the download is complete. The device sends an inquiry to other devices, identifying itself through its unique user ID (validated in advance by a central server) and providing the list of track IDs it is searching for (alternatively, the device can provide and compare the song name and/or other metadata to check for a match). The target device returns the list of available items it can provide, and then makes the file available for download by the other device. This can take place through a proprietary or open protocol, such as UPnP over WiFi.

In one embodiment of the invention, in addition to listening to various songs, a user can elect to transmit or broadcast one or more selections to the devices of other users. This feature may be accomplished, of course, only if allowed by the DRM and other security means for the selections. Broadcasting is performed using standard streaming protocols.

Figure 1D:
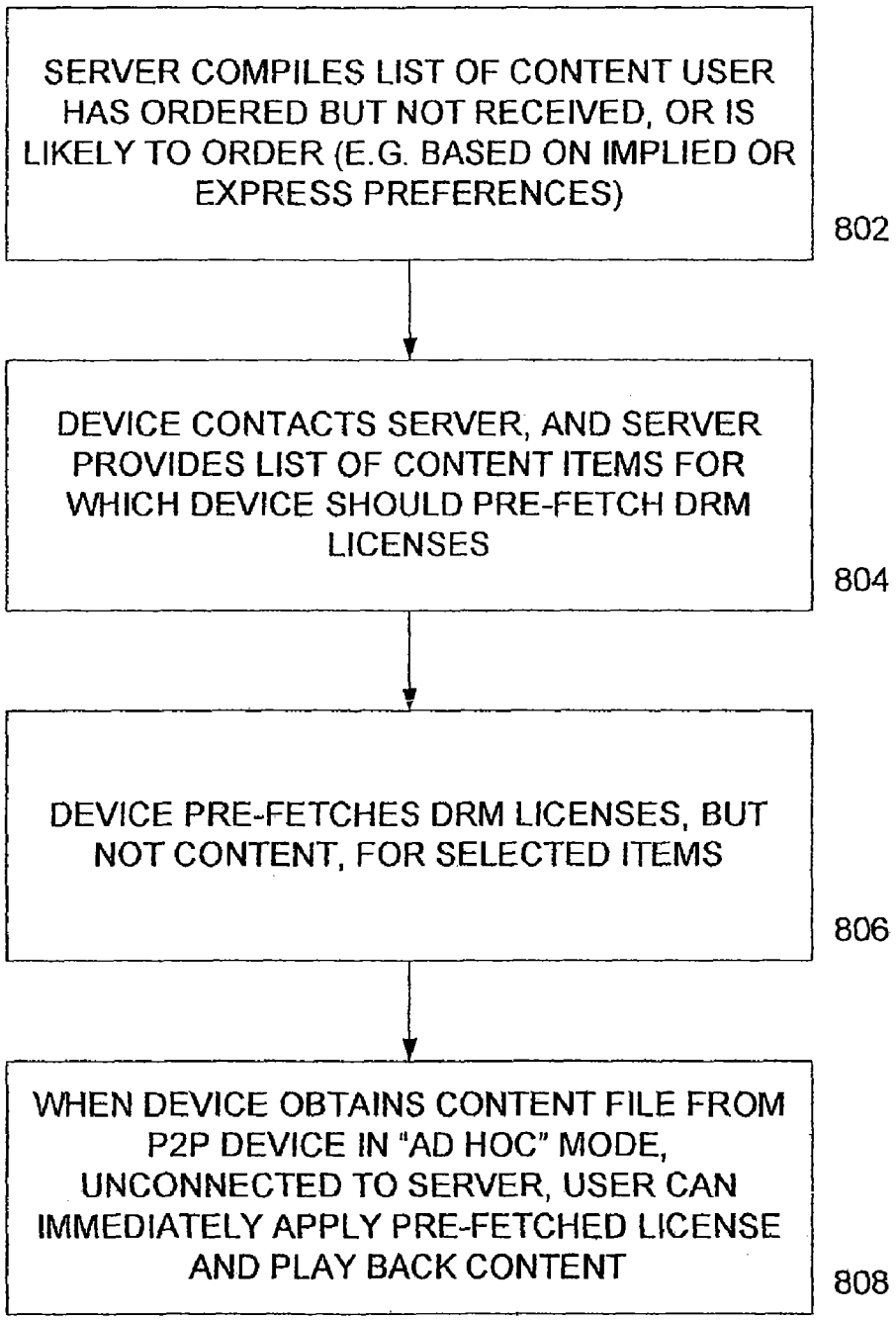
FIG. 1D shows a flow chart illustrating DRM license prefetching process.

Another feature of the present invention is the predistribution of DRM licenses. The content server 14 has a listing of all the songs that a particular user orders or has ordered (or, preferably, is likely to order, based on behaviors and preferences) but not yet received. When it becomes evident that a song is about to become available, the server sends to each of the users the required DRM license. Therefore, once the song is actually delivered to the users, the users can start listening to, and enjoy the songs without having to wait for a license, even if a central server is not present at the time. For a time-based subscription service that offers "all you can eat," each license would be valid for the length of the renewing period or shorter, and would be renewed accordingly only if the subscriber validly renewed the subscription. FIG. 1D shows a flow chart illustrating DRM license prefetching process. In step 802, the server compiles a list of the content ordered by the user that has not been received or a list of preferences likely to be ordered by the user. The device then contacts the server in step 804 and then prefetches the DRM licenses but not the content in step 806. In step 808, the user can then play back the content by applying the prefetch license once the device obtains the content file from the P2P device in ad-hoc mode.

Feature 8—Connection to a Cellular Telephone Network

Figure 3:
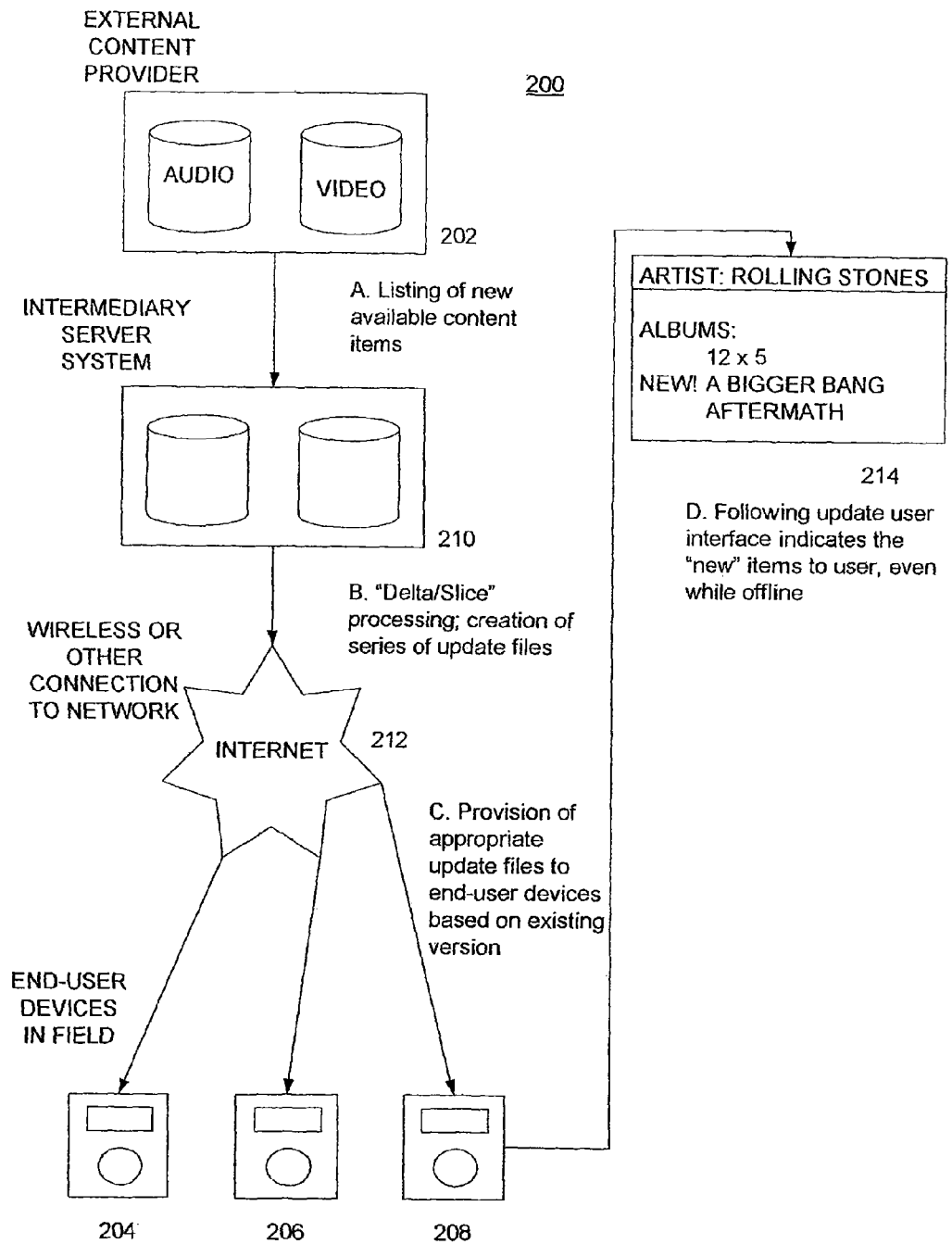
FIG. 3 illustrates a system in which new content listings are provided to an intermediary server system, compiled (and optionally compressed) into a format that is compatible with an end-user mobile device.
Figure 3A:
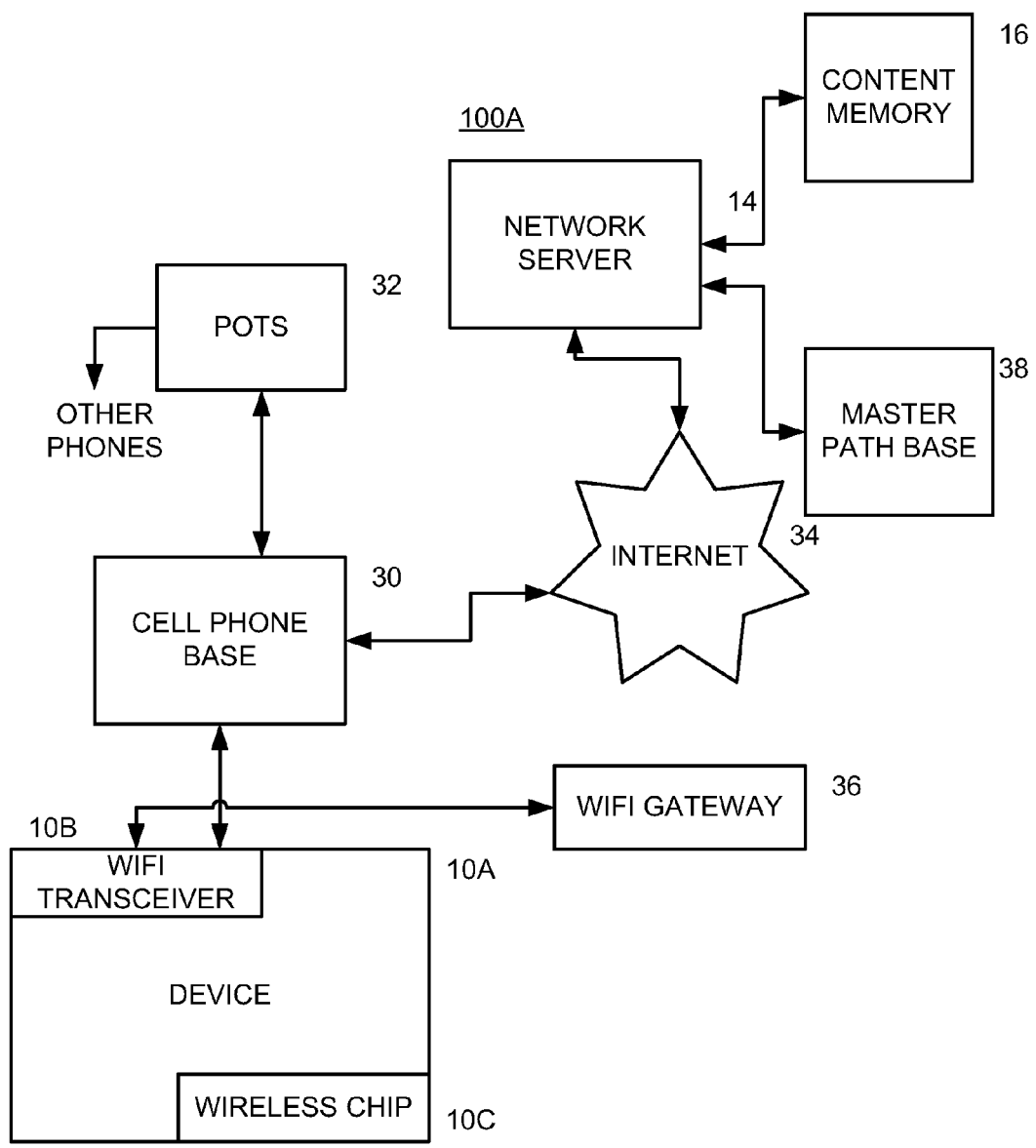
FIG. 3A shows a block diagram for accessing content through cellular phones.

In one embodiment, a device constructed in accordance with this invention and identified as 10A in FIG. 3A includes a wireless chip 10B such as GSM, CDMA, and/or TDMA (or broadband varieties, such as EDGE or EvDO) so that it can communicate with a common cellular network. In this embodiment, the primary purpose of the device can either be a phone (with a music/video add-on) or a digital audio/video player (with an optional phone add-on).

More particularly, referring to FIG. 3A, device 10A exchanges voice signals and data with a cell phone base. The cell phone base 30 is connected by landlines to a POTS 32 and through this connection provides standard voice communication with other cell or land-based phones. In addition, the base 30 is also connected to an Internet gateway 34 and provides Internet service (including e-mail, if desired) to device 10A.

In addition, the device 10A also includes an internal Wi-Fi (or other broadband wireless, such as Wi-Max) transceiver 10C through which the device 10A can communicate with the Wi-Fi gateway 36. Thus, device 10A can access the Internet either through the Internet gateway 34 and cell phone base 30, or through the Wi-Fi gateway 36.

The system 100A is shown as including not only the network server 14 with its content memory 16, but also a master content database 38. Database 38 is used as a depository for all the content available to the subscribers of system 100A.

The advantage of system 100A is that the device 10A uses the optimal network for connectivity dependent on the business and performance goals. For example, to allow the user to perform searches for content that it is missing, the device 10A uses the cellular network through base 30 to contact the master content database 38. Since this is a fast but limited throughput connection, the search results are returned substantially instantaneously.

However, if the user decides to order a typically large file, such as a video or audio file for download (e.g., as a result of the search), which are typically large files that consume a significant amount of bandwidth for delivery (especially when compared to a normal voice telephone call), the user can require that the device 10A only download the content using a Wi-Fi network (as opposed to a 2G cellular network or even a 2½G, 3G or 4G network like EDGE or EvDO, which may imply higher carriage charges), reducing the load on the cellular network for the operator while providing ubiquitous search access for the user-download access for the user would continue to require (or prefer) a Wi-Fi connection. Alternatively, the operator can offer the user the choice to download the content over a ubiquitous wireless network like EvDO instead of Wi-Fi, possibly for a premium price for the ubiquitous nature of the service when compared to Wi-Fi. In this later configuration, the device can continue to execute all communications via the Wi-Fi network when a Wi-Fi connection is available, but just make use of the cellular networks when a Wi-Fi connection is unavailable.

Feature 9—Sharing Playlists with Others

A system can be arranged so that new playlists are made, and the device automatically downloads the new playlists and the associated content for the user automatically. The user can specify the playlists by name (e.g., Party Mix #1) or type/genre (e.g., Rock Playlist #3), by selecting from a list that is made available on the device interface. Playlists can be sent just once to the device, or the playlists can be newly programmed periodically and automatically be sent down to the device. The device can add the new playlists to the collection on the device, so that a longer and longer list of content can be aggregated (which is preferably tied to memory reclaim logic, that deletes content automatically when a certain memory use threshold is exceeded for this type of content) or can simply replace the previous content.

The user can choose which of these playlists he would like via the device interface, as previously described. In addition, the list of available playlists can be made available on other devices, such as a PC using a browser to visit the user's account on an Internet site. The site can reflect the status of the playlist orders stored for the user's account. So for example a user can browse the list of available playlists, decide to add Party Mix #1 to his account, and then the device will download the playlist and content automatically (either one-time or periodically, to the user's preference).

Further, the playlists can be programmed and common across all users, or they can be customized to the tastes of the user, or a combination/hybrid approach. The tastes of the user can be captured in various ways—ranging from monitoring the user's downloading and playing behavior, to asking the user to state his genre or favorite artist preferences, to established and new collaborative filtering techniques, and other ways—and these tastes can then be used to generate a playlist of customized songs, relying on a database that associates the user's tastes with particular content (e.g., through Bayesian statistical means given a large enough population of users, human intervention, or other means or combinations of means). The length of the customized playlist may be specified by the user. The periodicity of delivering the playlist to the user may be specified as well. The playlist may be downloaded and/or made available via streaming or download (in which case, preferably incorporating progressive playback capability, so users have instant playback access after the start of the download) through a variety of devices owned by the user, including the Wi-Fi portable device (where content downloads automatically to the device—as the device polls the back-end to check for new updates frequently) or any of the user's PCs. Digital rights management technology can further be employed in connection with the content and the devices to ensure that the content in the playlists is respected accordingly.

Feature 10—Making Selections from Playlists

Figure 1E:
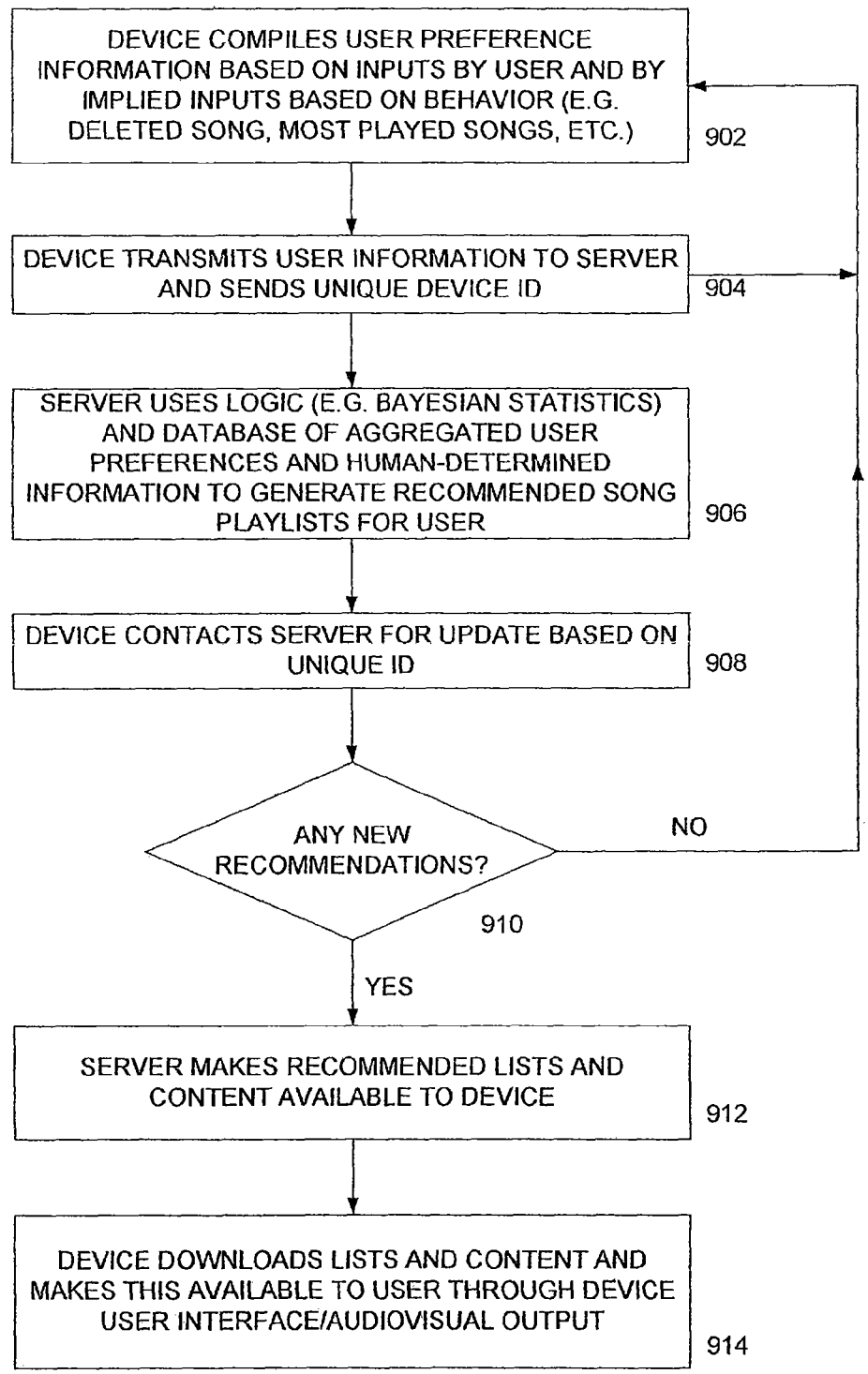
FIG. 1E shows a flow chart of users receiving recommended lists of musical selections.

Generally speaking, lists can be generated by a user in many different ways. One simple and straightforward way is to present to a user all the selections available from a content provider. The user can then pick and choose each selection individually, or select a plurality of songs based on specific criteria. Another method is to have the user provide the server with a profile that includes his preferences/dislikes. The server can then use the profile to make selections from a master list. Another way is to have the server present to a user generic lists, such as lists of featured songs generated at certain times, songs by particular artists, etc., lists of songs that are most downloaded, based on criteria such as overall popularity, age of users requesting a selection, physical location of the user, profession, income etc FIG. 1E shows a flow chart of users receiving recommended lists of musical selections. In step 902, the devices compiles the user's preferences based on inputs by the user and based on the user's actions (e.g., deletions, most played songs, etc.). The device then transmits user information to the server using a device specific ID in step 904. From the information, the server generates playlists for the user in step 906. The device then contacts the server for an update in step 908. If there are new recommendations (step 910), the server makes the content on the list available to the device in step 912 which is then downloaded and made available to the user in step 914. If there are no new recommendations, the device again compiles a list of user preferences (step 902).

The selections on a list presented to a user may also be based on more sophisticated criteria. For example, it may be selected based on data about the user's preferences and profile which may be obtained based on statistical cross-referencing (e.g., Bayesian statistics), through collaborative filtering, through compiling of the user's manual ratings, and/or through monitoring of the user's listening and downloading activity, or in a plethora of other ways, the server compiles a list of recommended content. The server then personalizes the content and sends a recommended list, plus the content files, to the device. The content may be protected in such a way that the content times out and therefore can only be used for promotional purposes. Or it may be permanent content, or delivered pursuant to a subscription service, or other model (e.g., "DMCA compliant" offline playback, which ensures users can't rewind songs, can't see the upcoming song selections in a playlist ahead of time, are limited in the number of skips, etc., per the Digital Millennium Copyright Act non-interactive streaming requirements). In this way, the user is provided with "customized radio" playlists that can be controlled (or, if preferred, hidden and restricted to the extent and/or until one or more conditions are met) from the user.

Feature 11—Sharing of Playlists by the Same User on Different Devices

In one embodiment, a user uploads content to a server to a "storage locker in the sky." This server could be the server shown in FIG. 1, or a different server. The server can be a commercial service or free, provided it can uniquely identify the user, for example through a secure user ID and password.

The user can then access that content—either by downloading a cleartext copy of the file, a DRM-protected copy of the file (the content file could be DRM packaged as soon as it is uploaded to the server and stored in encrypted form, or alternatively encrypted on the fly), or by streaming a copy of the file (e.g., over a protocol like RTSP, or via a progressive downloading scheme).

This allows the user to use distributed storage to store his/her media. It allows for content owners to ensure the content is not widely distributed from the central server.

The user can then access the content—from a multiplicity of places and through a multiplicity of devices, provided the user's account information can be conveyed and authenticated by the server. The server can limit the number of simultaneous connections for security reasons. Preferably, a user should be able to access his information only from a limited number of locations/devices.

When the user purchases content from a digital store, a copy of the content can automatically be deposited into the user's storage locker on the server.

Feature 12—Displaying Cover Art and Other Information on a Small Display.

A problem encountered in designing a small portable digital audio device is displaying relevant adequate information for a user during playback. For a music selection in particular, a user may wish to view the album cover art, the song title, the album title, the artist name, the playlist name, and other relevant information about the selection. However, a small screen may not permit displaying the cover art in a large and pleasing size for an average user while also displaying this metadata information in a large enough size for average users to comfortably read. Further, it is desirable to display this information for users without requiring the users to take manual actions. To address this, the cover art and other information can be made to cycle automatically from one screen to another, so that one screen fades or otherwise transitions from one screen to the other at periodic intervals. This allows the user to see the cover art and also other information (such as song name, artist name, album title, etc.) without having to manually make selections or push buttons. In one embodiment, the cover art is sent to the devices in a standard size and the device handles gif or jpeg resizing depending on the desired display. The image is stored in one size by the device, and delivered in only one size. IN an alternate solution that supports multiple device classes involves transcoding (either on-the-fly or in advance), so the server determines the appropriate (i.e., highest resolution) size art based on the class of device that is making a request, and then sends the appropriate file on through. The device can then re-size the image down, but not up unless the image is degraded.

Feature 13—Messages to the Users

According to one feature of the invention, whenever a user contacts the server through his player, the server sends information to the player adding or deleting entries such as the recommended or featured lists, an updated list for the user, and so on. This information is then displayed to the user. The server may present to the user other information, including messages from the billing department, etc. These messages can be presented as pop-screens, entries in an IN BOX, etc. Other entries presented to the user may include new or changed terms of service, other commercial products or services (including discounted or enhanced services) available from the server, and so on. Various services may be provided to the user, either on a per use basis, a la carte (e.g., the display shows items selected by the user during the set-up of the player), or on a default basis.

The system can be further configured to enable an administrator on a back-end server to specify particular places in the user interface of a portable or other device that connects directly to a network, and to customize the text and graphics displayed at those places as well as the options and interactivity offered to a user. For example, the administrator can specify that a popup should appear for the user every 3rd time the device is powered on, and the popup should rotate through 15 different messages selected at random (e.g., intriguing blurbs which capture the attention of the user, or relevant advertising messages). This is done via an automated procedure in the device software, which inquires of the server for a file to display for the user. The file specifies the location, conditions and content to be displayed to the user. It also lists the choices and specifies the actions that are taken when a user selects a particular item.

Feature 14—Transferring Content Between Devices

The transfer of content to portable devices is performed on a one-to-one basis from server 14 (as depicted in FIG. 1) to all the devices of the system, such as device 10 using standard protocols. However, content can be distributed by other means as well. One alternate means includes streaming content already stored on one portable device either to another portable device, or to many different devices. The transmission/media file could be secured or unsecured. Another alternate means is to receive content from a source, such as the server shown in FIG. 1 and to simultaneously stream it to one or more devices (or, depending on whether it would be desirable for the content to be persisted or to buffer against drop-outs, to use a progressive downloading scheme). One device could access the content of another device (either via streaming or progressive downloading, whether secured or not) by having the devices connect, say via an ad hoc Wi-Fi link, and communicate, say over a UPnP framework, and to use a common downloading or streaming protocol to enable the playback, e.g. via HTTP in a client-server fashion. Yet another means of distributing content is to have it distributed in pieces using a P2P file sharing protocol e.g., multiple devices connected to one another via a Wi-Fi ad hoc link could share files in pieces (e.g., technique employed by Bit Torrent), so that a single device is simultaneously sourcing different pieces of the same file from multiple other devices in a multi-threaded fashion, and then assembling the file into an integrated whole as the pieces are downloaded.

Feature 15—Content Distribution Using Bit Torrent

In the embodiments described so far, content was delivered to a player from a single source (that could be the server 14, or another player or device) using a standard network communication protocol, by streaming, or using a P2P protocol. Yet another alternative is to use a Bit Torrent-type protocol wherein different portions of content (for example, different portions of a song) are received from different sources. FIG. 1 F shows a combined flow chart and block diagram of an example of a P2P file sharing protocol across wireless portable devices. In step 1002, the devices are linked by wireless connections. Device A then seeks a copy of File X (step 1004) by sending an inquiry about File X to Device B (step 1006); Device B has compiled and stored an Index File, listing the files in that area available for sharing by all other devices in its network (step 1006). Device A is informed by Device B that Devices C, D, and E have copies of File X in step 1010. In step 1012, different portions of File X begins downloading to Device A from Devices C, D, and E in a multithreaded fashion tagged to indicate its origin. Optionally, in step 1014, Device A's optimization software analyzes the speed and connection quality of the transfer, which is then adjusted to optimize performance in step 1016. Finally in step 1018, an integrated complete copy of File X is assembled by the software of Device A.

In this way, multiple devices connected to one another via a Wi-Fi ad hoc link could share files in pieces (e.g., technique employed by Bit Torrent), so that a single device is simultaneously sourcing different pieces of the same file from multiple other devices in a multi-threaded fashion, and then assembling the file into an integrated whole as the pieces are downloaded. The pieces are coordinated via the use of an accompanying tracker file, which describes how the content file can be broken down into pieces. This allows for the receiving device to "map" the pieces and reassemble them into the proper order. The breaking up into pieces and development of the tracker file can be accomplished by a server in the network, or by a node/user in the network which is chosen manually (or, preferably, automatically based on characteristics such as upload speed and reliability of connection) to serve this role.

Feature 16—Exchanging Voice Messages Between Users

It is common for mobile wireless device users to create and record text messages which are then transmitted to one or more other recipients (which are generally also using wireless mobile devices but also who may be using, for example, a PC connected to the Internet to retrieve messages), such as via a SMS (Short Messaging Service) protocol. It is also common for users to leave voicemails for other users, where a recording is created by a machine attached to the recipient's phone line or which is provided at the network level by a phone or data service provider of the user. However, mobile wireless users today do not have ready access to an easy way to create an audio recording stored on the sender's device (say a recording of the sender's voice), and then to have it transferred to one or more preferred recipients. If the player includes a microphone, or a microphone input, the user can record a short audio message and send it to another player when both are connected to each other directly (in the ad hoc mode) or indirectly (via the Internet). In a preferred embodiment, a single push button on the player is used to provide this function. The messages can be sent using an IM (Instant Messaging) protocol capable of file attachments/transfer, or any other file transfer protocol capable of transmitting a copy of the audio file (or rendered audio) to the receiving device. Optionally, the user can also insert a music clip into the message, which may further be optionally mixed on the sending device into a single file with the user's recording (preferably, at the time it is being recorded, but alternatively afterwards) so that it serves as background sound (volume reduced) with the user's voice on top. (Alternatively, two or more distinct audio files could be transmitted to the receiving device, optionally with mixing information such as offset timing for start, relative volumes, etc., and the receiving device can be made responsible for mixing these two audio outputs, either in a process prior to rendering that creates an integrated audio file or during rendering.) Any compressed or uncompressed format (secured or unsecured) capable of being ultimately rendered into an analog audio output is acceptable, though compressed formats are preferred to reduce transfer time and storage space. The recipients' mobile devices provide an alert when such a new message is received. The recipients may be members of a buddy list, a chat room, names on an address list, etc. or may be strangers who detect each other's players over the wireless connection. More specifically, a user can record an oral message using a device (e.g., a portable Wi-Fi player). The device allows for a source (such as a microphone or line-in input), and uses a traditional digital encoder to allow users to create a digital recording (e.g., MP3 or WMA encoder). The recordings can then be sent to other users (e.g., through the Wi-Fi on the device, either directly peer-to-peer or through a service operator's central servers via the Internet, using its buddy system and community/messaging system). Audio files can immediately be sent to other online users and users connected peer-to-peer. Optionally, they can be cached by a central server and delivered to a device the next time it connects. There are several means for implementing this feature. In one implementation, a user selects a "buddy" from a list of existing buddies, as well as a list the device compiles from available peer-to-peer users (e.g., in ad hoc range for a Wi-Fi device) or presents a list from the central server (e.g., per the "chat room" approach described elsewhere). On selecting the buddy, the user is prompted to record the message as an audio file. The recording is made and stored locally on the device. The user uses traditional controls to start and stop, and if required re-record, the audio file. On confirm, the user can then send it to one or more desired recipients. Optionally, the device can be used to select several recipients at a time (e.g., via a pre-defined group, by making multiple selections of individual buddies, by selecting from automated groupings such as "all my buddies" or "my friends", by selecting from groupings compiled on the central server such as "all jazz enthusiasts"), and then send the same file to those multiple user devices simultaneously (e.g., through a Wi-Fi broadcast locally, point-to-point, or through a central server, which may optionally cache the file for users who are not currently online). Users can also optionally select buddies while they are using a device that is not connected to the network, and the device can store/cache the file and the list of target buddies until such time as the device connects either to a network or the target buddies in a peer-to-peer fashion, at which point the file is sent automatically.

Figure 1G:
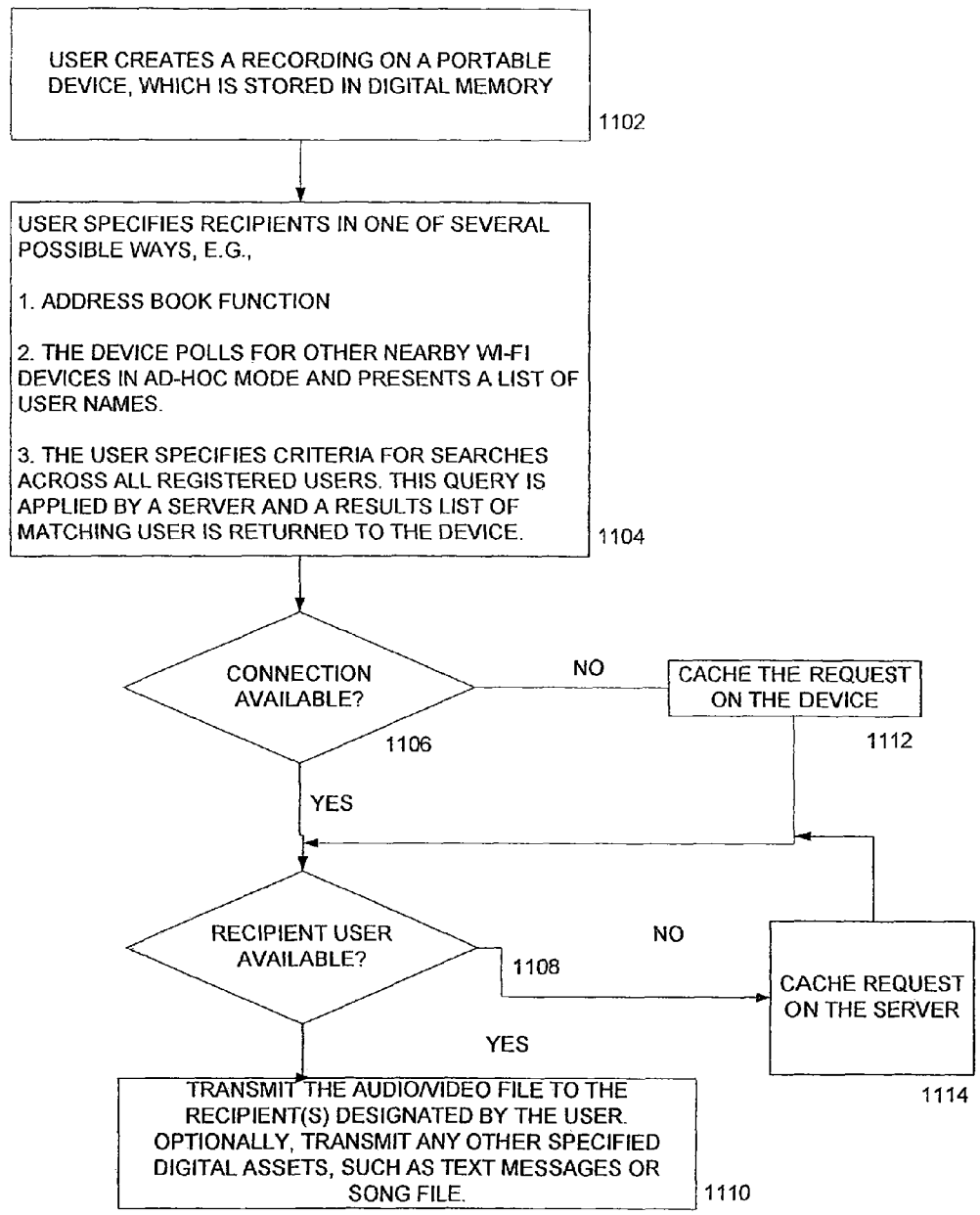
FIG. 1G shows a flow chart of audio file transmissions between buddies.

FIG. 1G shows a flow chart of audio file transmissions between buddies. For this purpose, the user records the audio file in step 1102. Then, the device presents the user with an option to "beam" the recording to one or more buddies in step 1104. The audio file is transmitted (i.e., a copy is recorded by the receiving device) to the other buddies as described as shown in FIG. 1G step 1110. If no connection is available in step 1106 or the recipient is not available in step 1108, the request is cached in steps 1112 and 1114, respectively.

The recording may be streamed from the device to the other users (again, either peer-to-peer (through a network or directly point-to-point) or through a central server). Accordingly, as the recording is being created it is simultaneously transmitted by the device to the other users. The receiving device(s) may optionally store the file permanently (or subject to DRM-enforced usage rights, which would be encoded on the transmitting device (or optionally by the central server)) or may not capture a copy of the file, in all cases described above. In all of the above scenarios, if the sending device permits video to be captured or stored, video may optionally be used in place of, or together with, audio.

Feature 17—Managing Playlists on Small Screen

Portable multimedia devices such as MP3 players typically have limited sized displays. A typical screen is black-and-while or color LCD with 128×160 pixels and is 1.6" wide, but more recently ranging up to QVGA or even VGA and a screen of 3.5" or larger, to enable a portable form factor for the device, and easy and convenient carrying, especially in a pocket. The devices also typically do not have an alphabetic or numeric keypad, but rather are limited only to a 4-way control and possibly a "select" or "enter" button. This arrangement makes the entry and management of large media collections difficult without the use of another machine, such as a PC, that offers a larger screen and more robust I/O, such as a full-size keyboard.

The present inventors have developed an arrangement through which, using limited controls, the user can easily create new playlists, name and re-name playlists, add songs, albums and other playlists to playlists, delete items from playlists, and re-order items on playlists, even with a limited sized display. More broadly, this arrangement also allows entering text on a device that has limited I/O options. This feature or arrangement operates by providing several screens logically interconnected with each other.

Initially, the user is presented on a screen with a plurality of options or choices. Selecting one of these options causes an associated new screen to be displayed. For example, to create a new playlist, the user selects a "create new playlist" option, and is taken to a second screen (which may or may not be a "popup box") that displays a number of blank character spaces, with a cursor indicated in the first character space. If the user selects the Up or Down key, the character under the cursor changes accordingly, sequentially from A-Z or from Z-A (with numbers and/or special characters, and potentially lower-case letters, cycling through in turn), as the case may be. Once the user finds the desired letter by "spinning" the letters in this fashion, the Right key advances to the next character space. The user continues to do this until the full desired name of the playlist is spelled out. The Left key operates as a back-space key, deleting the previous character. Alternatively, the Left key can simply move the cursor without deleting any characters.

To rename a playlist, the user selects a "rename playlist" option and is taken to a screen that displays the current name of the playlist, with the cursor located at one character space after the name. The user can hold the Left key for a specified time to clear all letters and return the cursor to the first position. Alternatively, the user can press the Left key quickly to delete characters, and/or can add characters as described in the foregoing paragraph.

To add a song, album or playlist to a named playlist, the user presses the Right key while the cursor or highlighter is located on the desired item to add. A list of options is shown to the user, including one that is "Add to a Playlist". (If this option is listed first among all other options, it makes the addition of items even simpler and quicker for the end-user.) If the user selects this option, the user is then shown a list of existing playlist names (and possibly the option to "Create a New Playlist"). If a playlist is not yet named, the user can be prompted to do so after requesting that an item be added to a playlist. Once the user selects a playlist from the list, the item is then immediately added to the playlist. The playlist may take any form of database and may use any form of identification of the items, such as file name or ID number (potentially embedded in the header of the content file itself). The items are added to the end of the playlist, which maintains a consistent order. The playlist may use a standard file type, such as .M3U, or may use a proprietary one.

Figure 1H:
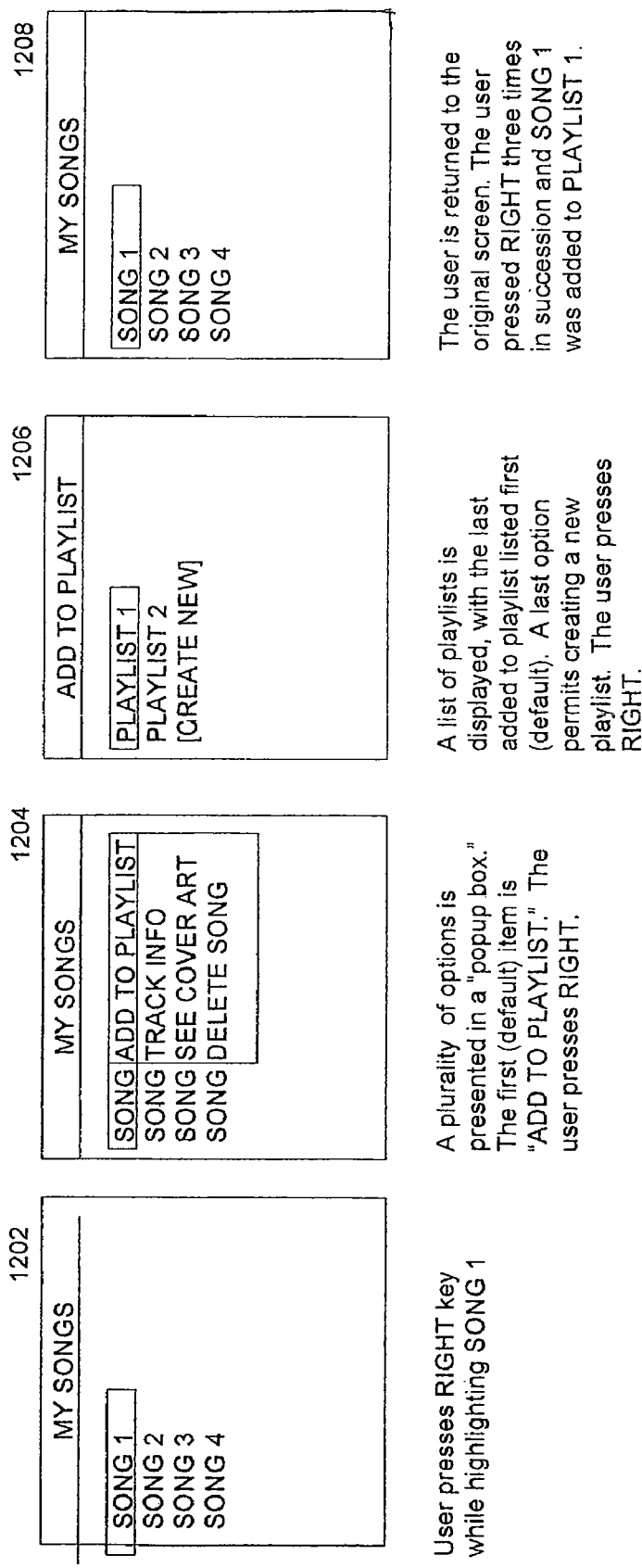
FIG. 1H shows a scheme for adding a song to a playlist.

The playlist to which items were most recently added are displayed at the top of the list, making the most-used playlists the most accessible ones to the user. Accordingly, by pressing Right three times on an item, the user can quickly and easily add that item to the most recently added-to playlist. FIG. 1H shows this scheme for adding a song to a playlist; In step 1202, the user presses the Right key while Song 1 is highlighted. In step 1204, the user then presses the right key to choose the "Add To Playlist" option. A list of playlists are displayed in step 1206 and the user presses the Right key to add the song to the selected playlist. The user is then returned back to the original "My Songs" menu in step 1208.

Once items are added to a playlist, the user may edit the order of the playlist. This can be accomplished by pressing the Right key on any song or other item listed in the playlist and selecting "Move this item Up/Down." When selected, the item is highlighted for the user (e.g., it may be displayed in inverse color, or with a different color background or in a different font). During that time, if the user presses Up or Down the item moves in the order of the list accordingly. The LCD displays items that are immediately under and/or above the selected item. When the user finds the desired place for the item, the user presses the Select button and exits this mode. The playlist may store this re-ordering information only on pressing Select after the final positioning, or alternatively each time the item is moved in the list upon the user's pressing Up or Down.

Feature 18—Sharing Content

Users of digital content seek ways to obtain access to new content as easily as possible, from the first available source of content. Also, given the large amount of electronic content available in today's world, users also benefit from a way that they can find content which is likely to be more appealing and/or relevant to them. One additional way of discovering new content is through a collaborative filtering method, wherein data and recommendations from other peers are used to provide one or more recommended content selections for the user.

Content owners also seek ways to ensure control over their digital content without overstepping on the digital capabilities offered to the end-users. A device (portable, such as an MP3 player, or otherwise) that is capable of connecting to a network (such as the Internet) and server, would allow for the following:

The device is capable of storing media, and/or of streaming and downloading media content from another electronic source (e.g., over UPnP and/or RTSP). Media can include music, video, and photos, and also any other type of electronic file such as e-mails, voicemails, spreadsheet files, word processing documents and text, and other data.

When connected to the network (e.g., the Internet), the device contacts a central server. The central server allows the user to manage a list of "buddies" that the user maintains via the interface on the device or another interface. When the device is identified to the central server, the central server sends back current (or the latest available cached) information on the user's buddies' devices. For example, it may send the current user ID of the buddy and the current media selection (e.g., song) playing on that device. The device can then display this information to the user of the device, and optionally update it in real time if the buddy is currently online. In addition, the user can instead find other users randomly through the use of "chat rooms", wherein the server sends a listing of currently available chat rooms to the device and the user selects an available chat room to enter. Once in the chat room, the user sees the same information, and is offered the same functionality (described more below), as though the other users were current "buddies".

Further, the user can select a particular other user and choose to interact with that user. In this event, the server compiles a listing of the available content files on the other user's device (users may optionally be given the right to hide particular files, or allow them to be seen but prevent them from being shared—this information is stored on the central server when changed and/or the device and used to filter the content listing that is compiled and sent). The listing may be in a particular order that is useful for searching and browsing, such as most recently acquired files in reverse chronological order, most frequently played, or alphabetic order. This order may be preserved in the transfer of the listing to the device. Each listed item may come with metadata, for example whether a particular item may be downloaded and copied because the content rights holder has granted permission for this activity. The metadata may also specify the conditions for the sharing, such as for example a song may only be played twice by the recipient and then times out, or the song may not be re-transferred to another device. The recipient device enforces these rights against the user through the appropriate DRM rules. The listing information pertaining to the other user may be displayed to the user of the device. If the user identifies an item that is of interest, the user may select it, in which case the device contacts the server. The server then may either provide an IP address (or equivalent for a non-IP network) where the device may connect and (subject to conditions, if specified) download or stream a copy of the file, dependent on the rights applicable for that particular item. A content rights holder may be given the right to specify that content not be downloaded in any way, but only streamed (requiring the second device to be online and connected during the playback, and preventing additional copies from being made while enabling users to try out a sampling of the content). In addition, a system that manages content rights can check whether the content indicated on the listing came from a verified source of content (such as, for example, a commercial digital music store operated in tandem with the central server that marks each file with a recognizable content ID), and offer only streaming rights (and no, or limited, download rights) for content that does not match content in the central server. Further, alternate methods such as audio and video "fingerprinting" can be used to verify the content of the file.

When the user selects a file, streaming (if permitted according to the rights enforced by the central server) may be initiated over any of a multitude of known protocols (e.g. RTSP) or over a proprietary streaming protocol. In addition, a downloading protocol can be utilized (e.g., via UPnP) wherein the recipient device enforces a streaming-like experience by, for example, (1) downloading the file and playing it back progressively as the download continues, (2) checking periodically during playback to ensure the transmitting device is still electronically connected and/or present, and (3) deleting the content file when finished to prevent the end-user from accessing it at a later point. The file may be encrypted or not encrypted-if encrypted, the recipient device needs to obtain information for decryption either during or in advance of the transmission from the transmitting device, or during the transfer or in advance from another source (such as the central server). When the user selects an item for download (as opposed to streaming), and the download is permitted, the device can use any of a multitude of known protocols for the download (e.g., via UPnP) or a proprietary protocol for the transfer. Upon receipt, the file can be encrypted or non-encrypted. If it is encrypted, the recipient device needs information to decrypt the file, either during or in advance of the transmission from the other device or from another source (such as the central server). This decryption information may be, for example, a DRM license file. The central server may, for example, pre-deliver DRM licenses as appropriate, say to paying subscribers of a server, obviating the need to check in with a central server upon or after the receipt of new DRM-protected content.

The system may also provide that specified content may not be streamed or downloaded in any way between devices.

The listing maintained by the server described above may optionally be replaced by a system whereby the listings are compiled and maintained on a distributed basis by end-users, which is a common architecture used for other peer-to-peer systems in place today. In addition, the rights offered in conjunction with each piece of content may be maintained with these listings, though a requirement that either the listing device or the recipient device is required to check in with a verified central server enhances the security of the system. Other actions of the central server may also be handled in this distributed fashion as well.

The devices are able to enforce these rules in accordance with the operators of the system by one or more of the following means:

maintaining secure software code in the kernel device, or otherwise ensuring secure software code is running on the device (e.g., via signed code techniques);

including a secure digital rights management technology in the software and/or hardware on the device;

taking steps to prevent or inhibit non-permitted software to run on the device and, in particular, access the content files and be able to render them or transfer them; taking steps to prevent or inhibit non-permitted hardware devices to be used to tamper with the protections offered on the device, such as by eliminating points where an electronic tool can be easily inserted across an electronic storage device and CPU to intercept electronic signals (e.g., to reverse engineer a process or break an encryption scheme); building devices as standalone devices with a defined set of functionality, which contrasts with, for example, a general purpose PC where users are generally invited to load new software onto the device and to access content on that device; including in these devices a way to connect directly to the network, such as through a WiFi chipset; providing for a method of securely updating the software and firmware on the device, such as through signed code sent to the device (automatically or manually at the request of a user) via WiFi (for example); including in the software on the devices code that is receptive to conditions associated with particular items of content sent to the device, some of which may be included in the DRM but some of which may not, such as "this song may only be sent to 3 other devices," in which case the device maintains a count of transfers of that particular content item to other devices and then prevents further transfers of the content when the count reaches the specified maximum number of transfers.

Feature 19—Hot Spot without Browser

The device can connect to Wi-Fi access points and the Internet without a browser as previously described. In some cases, a public Wi-Fi access point operator/provider will install software that does not permit users to access the Internet unless certain conditions are fulfilled. An example is a public Wi-Fi "hot spot" provider who requires that users pay for access to the Internet via its access point, such as T-Mobile, and accordingly uses software that redirects any device which connects to the access point and attempts to connect to the Internet to a "splash page" that requires the user to enter credentials—such as a username and password—before Internet access will be permitted. In some cases this sort of "splash page" is not used in connection with a pay network, but one available for free; it nevertheless may require the user to click on a button via a browser or take some other action to be admitted access. The back-and-forth communications between the user via the browser and the software/service, referred to as the "script", need to have been completed before access is provided.

Once access is permitted by a provider (e.g., because an action is taken by the user and/or credentials are verified against a back-end server), access can be openly permitted to the device. This may be enforced/arranged via a variety of methods, such as MAC address filtering.

To enable a user to connect that the wide variety of public Wi-Fi networks via a device that does not include a browser is a significant ongoing challenge. The present invention addresses this as follows:

Software code on the device, which may or may not include a browser, can be written to address the script. The back-and-forth communications (e.g. handling a "wrong password" message to a "click here to continue" message) can be received by the device and communicated to the access point (or software, wherever it may reside, including on a server) by the device by simulating the output of a typical browser for the access point. This would accordingly replicate the digital output that manual actions of a user on a browser would be sending.

Figure 1I:
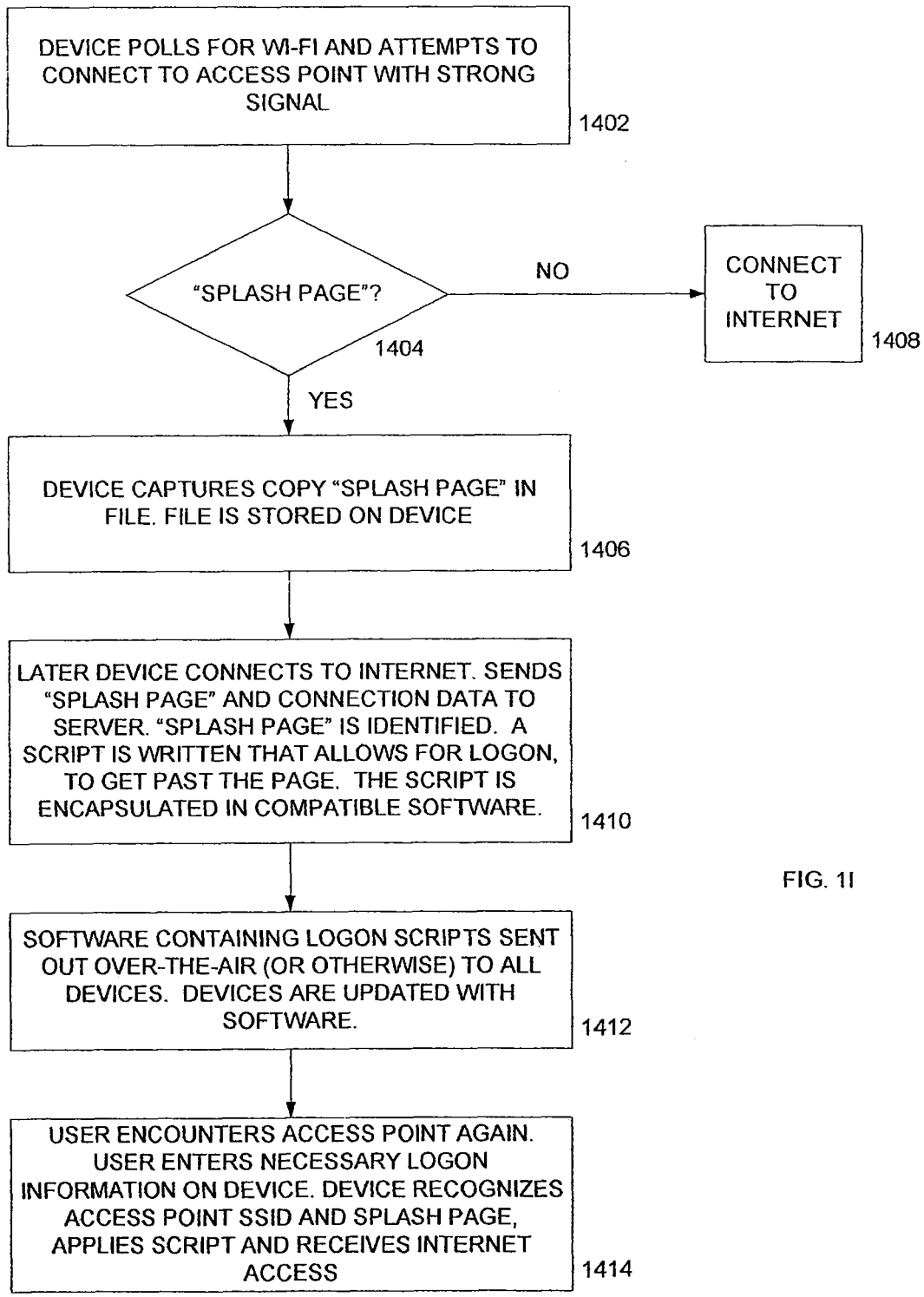
FIG. 1I shows a flow chart for adding a song to a playlist.

The device can provide an interface for the user to enter and store any credentials that are required for access to credential-based networks such as TMobile® Wi-Fi hot spots, as indicated in the flow chart of FIG. 11. As shown in FIG. 1I, the device attempts a connection to a Wi-Fi access point in step 1402. If a loading screen blocking free Internet access, a splash page, does not appear in step 1404, the device connects to the Internet in step 1408. If a splash page appears, in step 1406, the device stores a copy of the splash page as a file and then in step 1410, the device connects, to Internet and sends the splash page and connection data to the server. The splash page is then identified and a script is written to allow the user to enter logon information. In step 1412, all devices are sent logon scripts from the server. In step 1414, the user then enters necessary logon information and connects to the Internet.

The script of a network can be analyzed by an engineer to diagram/list all the back-and-forth communications that are required for a logon to the network or to otherwise provide access. This analysis is used to develop the code that replicates the required communications output for the software/service serving to block access.

To manage the increasing and changing number of various access point connections, users of the devices are used to collect information on the required scripts. Because the device they carry connects to the Internet at least periodically, it is capable of sending and receiving information. When the device encounters a script that it is incapable of parsing to access the Internet, it can then store a complete record of the communications and/or "splash page" that prevented this access. This information can then later be communicated over the Internet back to an engineer (preferably sent automatically by the device), who can then develop a new script for communicating with that particular access point. When the new script is developed in software for the device, this new software can then be sent back to the device and installed so that it can then gain access at the problem access point the next time This system can be replicated across hundreds, thousands, or millions of devices or more. With many users in the field encountering these networks, collecting information, and sending it back to a central back-end repository, one or more engineers can use this captured information to create software that replicates the needs of any particular script and then send out this new software to all devices in the field. In this fashion support for a wide variety of Wi-Fi networks without a browser can be provided, with few requirements of a non-technical user, and even in the face of access points that change their logon methods and scripts over time.

Feature 20—Telephone-Based Music Service

Figure 1J:
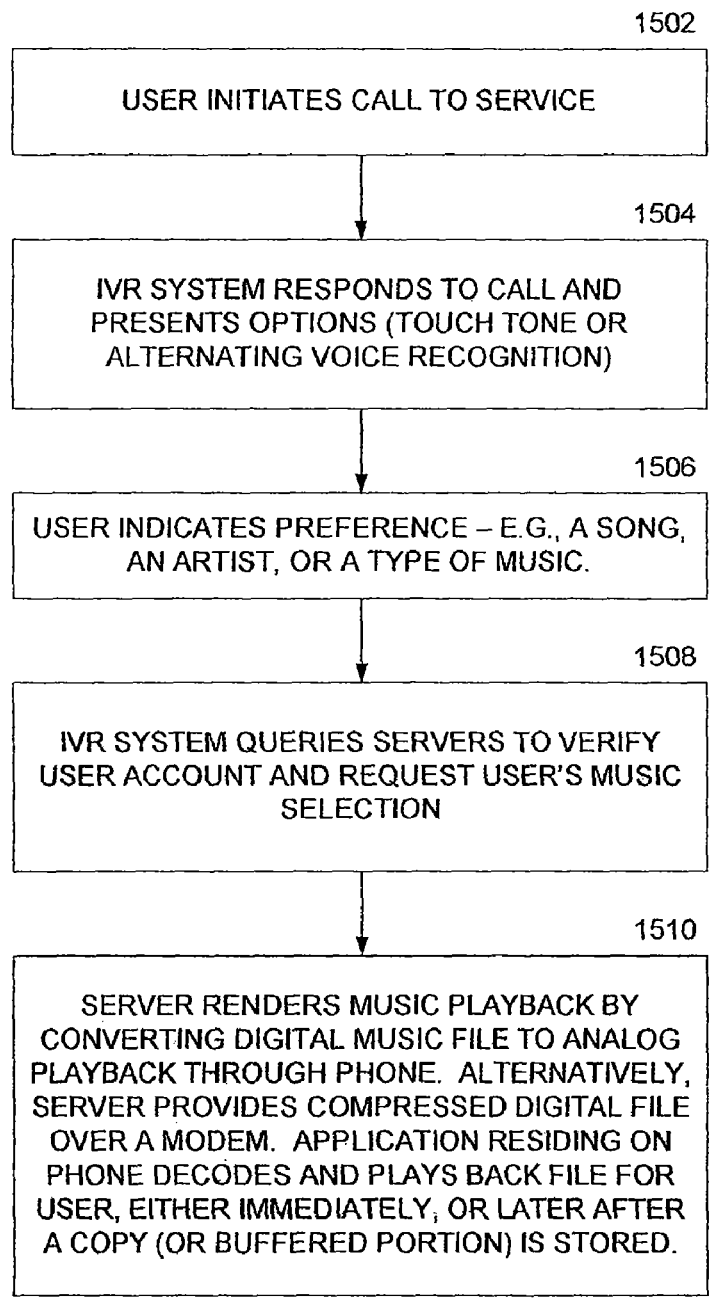
FIG. 1J shows a flow chart for downloading a song to a device through a telephone.
Figure 1K:
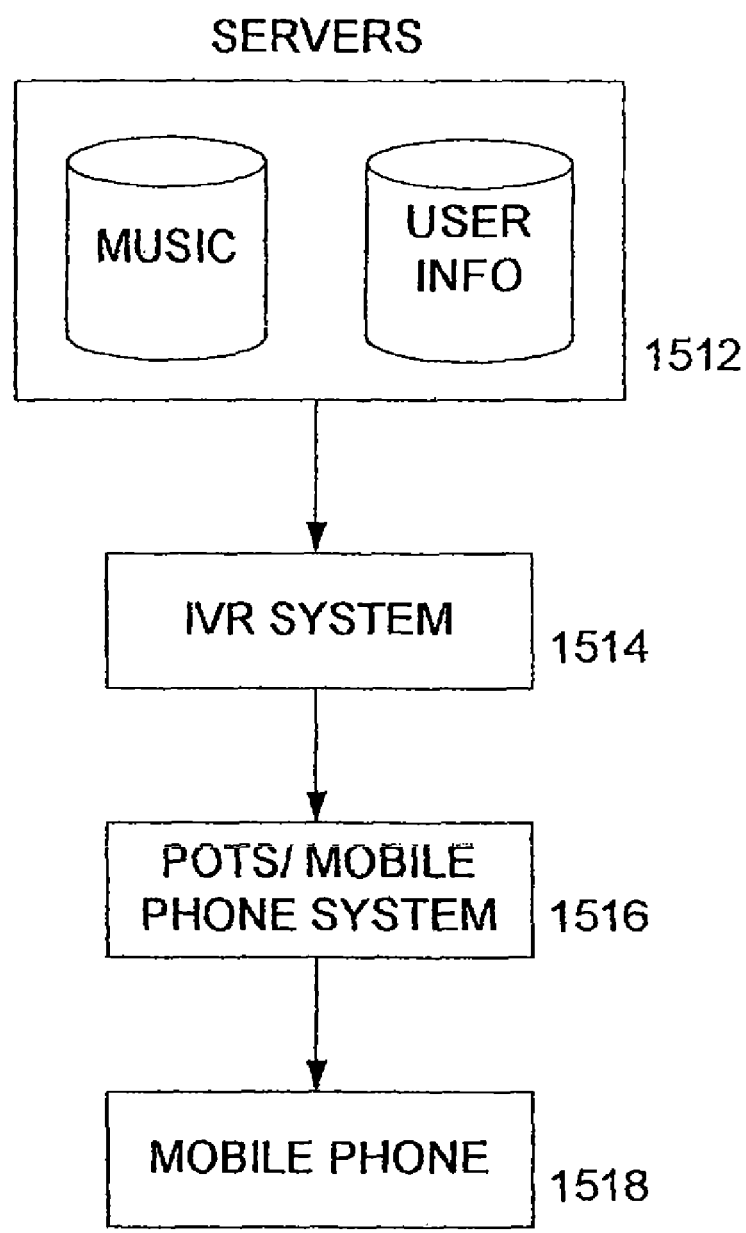
FIG. 1K shows a block diagram for accessing content via any landline or mobile phone.

Another feature of this invention is that a user can download or stream content from a server using a telephone connection. FIG. 1J shows a flow chart for downloading a song to a device through a telephone and FIG. 1K is a block diagram of the system used to download songs. The system includes one or more servers 1512 holding user information and content (songs), an IVR system 1514, a POTS or mobile central telephone system 1516 that is accessible through a mobile telephone or other telephone 1518. A user dials telephone number from telephone 1518 (preferably a toll free number) in step 1502. The rest of operation can occur automatically or manually. For automatic operation, a recorded voice (using IVR system 1518) asks the user if he would like to listen to radio, his personal collection, or find a new song in step 1504. If he wants a new song/album, he chooses to search by artist, by album, or by track (or other ways) in step 1506. He says the name, which is voice-recognized, and then can narrow in on his desired item. (Alternatively, a touch-tone menu driven hierarchy can be used. This is preferable where the voice recognition software is not advanced enough to handle the large number of possible human responses, and/or where the user would prefer to use buttons to make a selection based on accuracy, speed and convenience of not having to disturb others who may be around him/her.) In step 1508, the IVR system 1514 then queries the server 1512 to verify the user account. The server 1512 then calls up that item from a digital database. The request starts playing it over the phone, streaming in an appropriate bandwidth-matched compressed format or simply rendering it as analog audio in step 1510.

Feature 21—New Album Indicator

Previous devices typically included a display (such as an LCD display) on which a user could selectively obtain information of various selections available for listening and/or other functions, using a relatively simple user interface. Referring to FIG. 3, a catalog system 200 in accordance with this invention consists of a server-side component, the intermediary server system 210. This component collects and aggregates a list of new releases of available content from various external content providers 202 (e.g., recorded music albums which have been digitized to a compatible format, relevant metadata fields for each record, for such an album, the recording artist, the title of the album, the year of publication, the genre, art work etc.), which may be connected to the intermediary servers 210 over the Internet 212. (Of course, the operator of the intermediary server 210 can also opt to operate the external content provider 202, rather than rely on external sources, or may use a hybrid approach.) The intermediary server 210 uses this data to generate and update the listing of all available content for various users. A selected subset of the content is stored in local databases on end-user devices 204, 206, 208 in the field. The database on each end-user device 204-208 allows users to search for and order content even while their respective devices do not have an active connection to a network, and with less latency than a search requiring a query of, and response by, a server over a connection. A database may, for example, store the listing/metadata for 3+ million available musical tracks, albums, etc. or videos that are available for download from a commercial digital content service or content provider.

The new data is then passed to and handled by an intermediary server system 210 performing a "delta file" process. This process has as an output a series of incremental file updates that are stored on the intermediary server 210, each of which is intended to provide an update for a particular previous update version of the catalog (i.e., representing the differences/changes between a fully updated catalog and one that is not yet updated). This allows each of the end-user devices 204-208 to access the intermediary processor 210 and obtain a version number or last update time for its local catalog database (e.g., a device which was updated last month and missed 5 intervening catalog updates might indicate a version number of 25, while the current updated/available version is 30) and request a single update file which is perfectly matched to bring the catalog fully up to date. The update file includes only the incremental changes (i.e., additions, amends, and deletions) that are needed to update the device's existing, older stored catalog to the current version. Once a device, e.g. 208 is made aware that an update is available, it downloads the single update file (which, to increase download speed and reduce size, may preferably be compressed) from the intermediary server 210, and then runs an internal process which updates this catalog, inserting new records and deleting or amending old/existing records, resulting in a fully updated catalog that the user can then search, which would include the latest album releases. Alternatively, the delta process may determine that it is more efficient to send an entire new image of the database (or portion thereof rather than an incremental update. Finally, the delta process in processor 210 may determine that a device catalog is damaged and needs to be completely replaced. These update files (whether incremental only or complete catalog replacement) may also alternatively include information that specifies how all or portions of the complete updated catalog are displayed to the user through the user interface. In other words a "slice file" may be incorporated representing an update to a particular catalog (e.g., a list of the Top 10 track IDs). The respective device, e.g. 208 then will display these specified tracks to the user under a "Top 10" item located in the user interface, allowing the user to see recommended tracks, etc. in addition to searching for any of the available content individually, and to order those tracks individually or as a whole collection).

The server-side component 210 stores a number of updates dating back to a reasonable point—for example, any device that has a version number or date that is within 6 months old. (Preferably depending on server side, a minimum version number is selected which optimizes the desired storage space that is available for this process on the server side, as well as the trade-off between the device's performance in downloading and updating an incremental update file instead of the full catalog as a 100% replacement.) The server-side component 210 has a code which delivers the appropriate update file (created and stored on the processor 210. or other servers) to an end-user device 208 depending upon the version number the end-user device 208 provides. If the end-user device provides a version number that is below the minimum, the processor or server 210 provides a database file which consists of 100% of the updated catalog, as a complete replacement for the existing local database on the device. If the version number is above the minimum, it provides an appropriate update file for download that the device can then process.

The process described above is advantageous in that it provides a single update file to devices which may not have continuous, "always on" connections to a network 212. It provides a rapid and efficient way for devices which may have a variety of "last points/times of contact" with the network to be brought up to date for the end user, opportunistically whenever the device is able to establish a connection. (Depending on local storage availability (e.g., if the device is designed to keep two copies of the catalog so that one may be updated while the other is used for searching by the user) and the method of update on the device, the catalog may not be searchable by the user during the period the device is processing an update. An appropriate message may be shown to the user at that time, if the user attempts to search.)

Preferably the system is constructed in a way that permits the operators of the server to dynamically control what portions of the total available catalog, if not all, are made available via this replication and updating process—for example, for a device that has memory constraints, perhaps it would be desirable that only the top 10,000 tracks of the catalog be searchable via this method, and that users be required to search via a live connection for any others, in a hybrid approach. For devices with constrained memory, it is preferable that the approach be a hybrid one that combines the on-device catalog system described above with "live searching" across an active connection to a network and server-side system. In this way, the system balances the constraints of limited memory against providing relevant search/browse results to the user with limited latency, and with reduced reliance on a network connection, when available. Any of several methods for selecting which content titles should be included in the partial on-board catalog can be used—preferably a method is chosen that provides the greatest chance the user will search those titles so that a search against the servers is as unlikely as possible. For example, the system might monitor the downloading behavior and other preferences of a user—if the user, for example, indicates that he/she likes jazz, the top 10,000 jazz tracks from the service might be provided, since it is more likely that these tracks will be the ones that user would like to search. Or if a user has downloaded music from the artist Charlie Parker (or, e.g., video movies from Spike Lee) but otherwise has a lot of 80's music, the system might provide that user's device with a catalog that includes all the works of Charlie Parker but otherwise 80's music-oriented selections (or, for the video example, all of Spike Lee's movies, plus a listing of the other videos that more generally comport with the user's media consumption preferences and tastes). The system preferably pre-packages and stores these files for the end user devices to download in advance, so that it minimizes latency during the time the device is connecting to the network to obtain updates, and so that it optimizes other aspects of the system and servers, but alternatively these custom catalogs for end-user devices can be constructed "on-the-fly" in any degree of desired granularity—i.e., record-by-record for maximum granularity, or alternatively from "building blocks" that are pre-built and successively sent as updates (or catalog replacements) to the device. In the example above, for example, the user might get the 80's music "building block" plus other relevant areas of the catalog. This balances the pre-building optimizations (e.g., storage on the server-side system) with a higher degree of customization for an individual user device.

In addition, the operators of the server would preferably maintain the ability to dynamically change how the category of files appears to the user on the user interface, such that a "slice file" may list the "Top 10 Hits" one week, and the next week this may be changed to read "Favorite Summer Songs." The slice file would list the songs that should then appear when then user selects this item. The text that should appear in the user interface would accordingly be preferably communicated, at minimum, each time that the operators desire the title of the category to change. This can be achieved in multiple ways, preferably through a framework approach wherein the user interface of the device will respond to data that can dynamically adjust the structure of the user interface without requiring a re-boot of the device, including allowing the data to reconfigure the levels of trees in the menu structure, creating nested options, etc. Alternatively, a more simple and limited approach, which is preferable if simplicity is important, would designate certain elements of the user interface to be dynamic (e.g., the title of the menu option under a "Get New Music" option, as shown on display 214), but require other elements to remain rigid (e.g., the menu item must include only one layer underneath, which must consist of a listing of tracks, not albums or artists).

Any number of variations and improvements to the above process are possible. In one particular variation, it is desired to indicate to the user through the end-user device user interface which titles are new, so that new material can more easily be found. To achieve this, the update file can preferably include a "date of release" metadata item for any desired record (e.g., a musical album) where this information would be useful. The user interface of the device can then use rules in displaying the listing of albums for a particular musical artist which place a "NEW" icon next to the items that had release dates that are, say, within three months of the current date at the time the device is being used. This is a preferable method, though other methods might involve the update files themselves indicating a 0/1 bit setting for whether a particular item in the database should be signified to the user as "NEW". (This method would not work appropriately for devices that did not connect with at least reasonable frequency to the network, and accordingly is not preferred for devices that are not assured of frequent connections in a normal use pattern by an end user.)

Feature 22—DRM and Other Proxying

It may be desirable for a commercial or other content service to employ any of a number of security-related features. These could include the use of digital rights management (DRM) technology, which encrypts a content file in a particular manner before it is transmitted/made available to a receiving user device. Other security features may involve requiring user/device authentication, or encrypted and secure transmissions of a certain sort. Microsoft® Windows Media® DRM is an example of a DRM which is frequently used by commercial content services to protect content that is made available to end-users. It is also important to recognize that such a DRM technology is preferably used as only a part of a larger system and may not be sufficient on its own to meet the needs of a complete commercial content distribution system—i.e., the DRM technology itself does not include all items necessary for a commercially viable content purchase, subscription or other commercially oriented system. In particular, information that is not a part of the DRM system, such as personal identification, is necessary to bill the end user for services and determine what particular digital rights a particular recipient is entitled to. In this case, it is necessary for the device maker to provide the means required to supply the "account"/user information needed by content provider systems to allow content to be delivered to and rendered by the device, and this information must be provided to the DRM system in a compliant and secure manner at the time the device is transacting with the backend content distribution systems.

It further may be desirable for a device maker or service provider to allow an end user to access any of a variety of existing or future content services from a single device, which services may or may not employ any or all of these security means in the course of providing their services.

It may be difficult to enable access to these secure services from the device due to inadequacies of the device. For example, if a new secure content service comes into being, a device may not have adequate processing power to handle certain aspects of the security, or may have difficulty complying with a required authentication protocol unless its firmware/software is upgraded. In particular, for example, a problem for DRM-based services might be that a proper DRM request to a server requires a requesting device properly combine the content request with authentication information in a form that is encrypted in a particular manner, before it can be issued a valid DRM license that would enable decryption of the content during playback rendering and/or other functions. Further, there is potential that the service will later change its requirements for this process. This may happen frequently over time, for example, because hackers eventually "crack" the security means and it is necessary to employ a new one or make modifications, or because the service seeks to implement new security features or a new version of the DRM. Further, complications may arise when multiple services use multiple types of DRM or other security measures, which may in particular create operating issues for a device of limited means such as a mobile device.

This problem poses a significant issue for device makers and content providers. Even if difficulties can be overcome to enable a device to connect to a particular service, these companies face the risk that a future version of the service or the addition of a new desired service will make the device incompatible, resulting in angry end users. In particular, if the device maker or other intermediary in the distribution chain does not control each of the services being provided, it may not be possible to make a change on the server-side to repair the problem. Accordingly, these parties are faced with the difficult choice of requiring an update of the software/firmware on the end user devices in the field, such as a wireless mobile phone, either by over-the-air download or by sideloading. This creates a potentially undesirable situation for the parties involved, as this creates potentially significant inconvenience for the end users, impedes the entertainment or other experience the providers are attempting to provide, and creates risk, cost and time involved in creating the upgrade for the handset. A solution that does not require modifying the software/firmware on the handset is accordingly strongly preferred.

Figure 4:
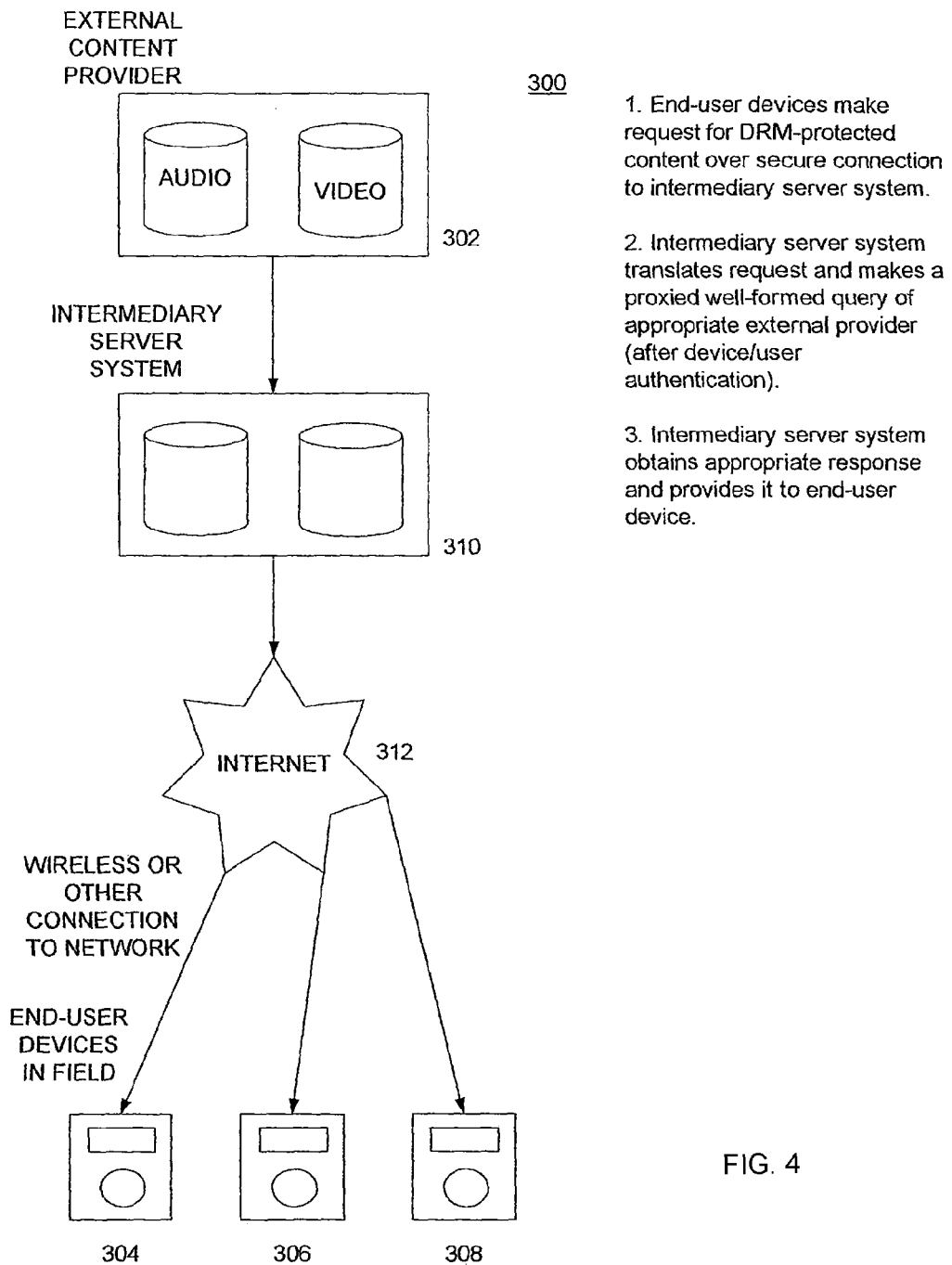
FIG. 4 illustrates a system with security means employed between an end-user device and an intermediary server system in which the intermediary server system handles a request for content that involves one or more security means (such as DRM) for the device, insulating the device from changes to the security protocol over time and other problems that may arise.

The present invention seeks to solve this problem by providing a proxy to a DRM request or other security means via a server-side request made on behalf of the device as shown in FIG. 4. In this figure, system 300 includes a external content provider 302 or other means used to store content and to release the content to various devices 304, 306 and 308 using the process described herein.

The external content provider 302 exchanges data with an intermediary server system 310 that is connected to the Internet 312 for sending content to the devices 304-308. Through this intermediary server 310, the devices 304-308 are insulated from changes that may occur and protected from requiring ongoing modifications and upgrades. Significantly, it is also a mechanism whereby a single device can easily acquire content from a plethora of content providers, even if potentially different compliance requirements/protocols are required by the various providers to obtain content from the service. To ensure that security is still effectively provided, the device (e.g. 306) identifies an intermediary server 310 as a first point of contact for a specified class of transactions (or all transactions, depending on the desired function of the device). The device 306 and the intermediary server 310 establish a preferred authentication/security means, so that the intermediary server 310 can always authenticate and handle secure communications to the device 306. The intermediary server 310 has a means to identify, authenticate and collect valid user/account information of the devices/end users 306-308, as needed to enable the supported services, for example by using a look-up table.

As an example, in the event the device 306 seeks to download DRM-protected content, it sends a request to the intermediary server 310 (in particular, this may include an identifier for the content desired, as well as authenticating data identifying the device to the intermediary server 310). Based on the request, the server 310 then recognizes that the device 306 is seeking to access content from a particular external content provider—for example, a provider of DRM-protected music content files. The intermediary server 310, which is routinely kept updated by a server-side team, contains code which knows to reformulate or translate the DRM content request from the device 306 into a well-formed query that is suitable for example for external content provider 302. In particular, with, for example, Microsoft® DRM, the query may involve combining certain individualized information of the device with the request, plus information contained at the server level which may pertain to a "master account" established between the intermediary server 310 backend and the content provider's servers 302, or information pertaining to an individual account on the content provide that was created on behalf of the device by the intermediary server. The intermediary server 310 then makes this request on the device's behalf to external content provider 302, and receives back a response (in certain cases, potentially after multiple required back-and-forth authentication-related exchanges) which the device 306 is able to interpret (alternately, if an error code is received, the server may similarly be updated to intercept and cure the error, or alternatively to interpret these error codes and provide an appropriate translation of this error to the user device so that its current software version is able to translate and make use of the error information). This response is then passed on to the device 306, which may for example consist of a URL from which the device can obtain the desired content file.

This proxying of the DRM request has thus insulated the device 306 from issues of changes and other problems that may occur in an ongoing and evolving security environment. It has further allowed an intermediate server 310 to offer content to the device 306 from a plethora of external content providers 302 without the device 306 user needing to directly establish a business relationship with each provider 302, or to implement a multitude of access or security protocols on the device 306 that may be needed for each particular provider 302. (The operator of the intermediary server 310 can opt to automatically aggregate certain services for its users in this fashion, or alternatively can take another approach, such as allowing users to manually specify from the device interface or a PC which of the supported services they would like to add to their accounts.) It also has the further benefit that, in the event the device 306 has only intermittent connectivity and the negotiation of the security protocol could take time while the device 306 is "on hold" between interim responses, the server 310 can carry these transactions out even if the device 306 has lost connectivity in the interim. It has further provided more flexibility for the operator of the intermediary server, who can choose to provide more or less information to the external content providers as desired, based for example on a desired business relationship.

Feature 23. Music4U/Send-to-Device

With devices that are able to connect directly to a network (e.g., the Internet) in some way, there is potential for users to obtain content directly, without using an intervening device such as a PC. However, a problem faced by many users, device makers, service providers and others is that the user has a vast/enormous selection of available content to choose from, and it is difficult to navigate/search/browse, identify, order, download, play and manage content that is well-suited to the end user, particularly from a device with limited user input and output such as a wireless mobile phone.

By contrast, while still a difficult problem, users have a somewhat easier time browsing and navigating available content when they use a traditional PC, which typically offers a larger screen and more available and navigable input devices, such as a mouse and keyboard (and possibly a more stable, speedy and economical Internet connection). Further, as PCs typically establish a more "always on"-type connection to the Internet, Internet-connected content services are able to provide stream-able and downloadable samples on-demand to help users determine content that is appealing before committing to what is often a longer and more involved download process to obtain the full content, or prior to making a purchase or other business commitment.

Content services that enable content access on portable and other devices typically require users to make selections on a PC, and then manually connect the device to the PC—perhaps through a USB or "Firewire" connection—to transfer the content from the PC to the device.

Figure 5:
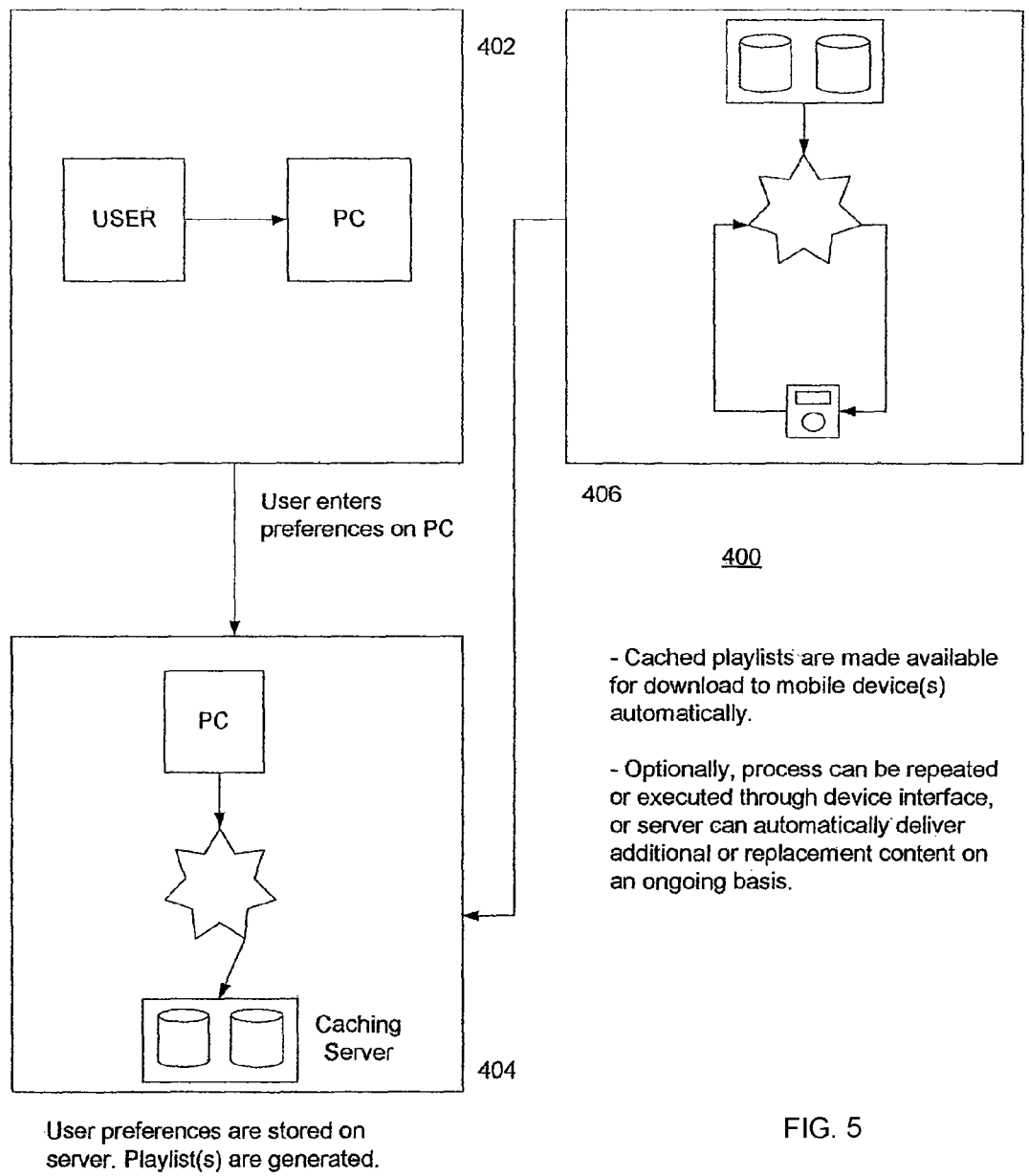
FIG. 5 illustrates a user sets preferences on a PC (or on a mobile device) and have the server generate playlists/content which automatically get sent to the end user device.

The present invention allows users to maintain the advantages of the PC in identifying and selecting content, but avoids the need for the user to manually connect a mobile or other device to a PC through a local connection. The process is illustrated in a somewhat simplified version in FIGS. 4 and 5. The process 400 starts in step 402 with a user entering his orders, preferences and/or selections via any connected device, including via use of a browser on a PC or other device. These requests are stored on an intermediate server, such as server 310. The user may accordingly use a PC or any other desktop or hand-held device for searching, browsing, sampling, etc., and then make a selection to "send to device" any or all of the content he/she is finding via the search, to have the desired selections remotely sent asynchronously to the target device. The selections are stored by the intermediate server 310 until a specified mobile or other device (or, potentially, all PC, mobile and other devices associated with a particular user's account) makes contact with the intermediary server 310 (step 404). At that point the server 310 notifies the respective device that selected content/preferences, etc. are being cached and are ready for delivery to the device. The device then automatically request download of the content and other items that the server 310 has made available. (Further, a syncing mechanism can preferably be used to manage conflicts that may arise between actions a user took on the device and the server 310, or to manage conflicts between local preferences set by a user for one device and new content that becomes available.) (Step 404)

In one implementation, for example, a new user can join a commercial service via a Website. The user can quickly be prompted to provide specific or general information about his/her preferences—for example, a user can indicate a preference for jazz music and 80's rock music, and/or specify a preference for music of Ray Charles and Beyonce. (This information may alternatively or additionally be collected in other ways, such as by monitoring preferred content selected by a user in the course of using the service, by observing behavior when rendering content such as "skip/FF" or "don't like" button presses, or other means.) After entering this information the server can use this information to generate a proposed playlist for the user. Playlist generation can be achieved via a multiplicity of ways or any combination, which are known to many experienced in the art. They include, for example, recommendation technologies that use Bayesian statistics, manually-created artist/genre/track associations, content-analytic techniques, and other methods. In its simplest form, pre-made playlists may be created and stored on the server, and inputs from the user can be made to trigger a complete or partial/random selection from the pool of selections included on the relevant playlists. Content can continually be added and cycled on the playlists, such that they appear to be "endless playlists" or radio station-like in appearance to an end user.

Once the playlist is generated, the user can opt to have this playlist sent to his/her device (or, preferably, this step can be made automatic). At this point, the server will store a record that the user's device should be updated with this playlist and content at the next opportunity. The next time the server detects that the device has contacted it, the server informs the device that there is cached information waiting and makes a specific URL or other means available for the device to download the cached content. In this way, settings and selections of the user that were entered through a PC interface are sent to the user's device. The user need not struggle through a limited user interface, screen, and input means to select content from a vast catalog of available content. The user also need not manually connect the device to a PC and make a secondary transfer over a USB cable or other means. Instead, this step is automatically accomplished.

In one further variation, the user may indicate a desire for content matching his/her preferences to be periodically sent on an ongoing basis. In this case, the server can be made to periodically create additional playlists (which do not overlap the content previously sent to that user, except to the specific extent desired), and to repeat the procedure above whereby it makes the content available to the device. In this way, a user need not even revisit the PC to change preferences but can always receive more content.

In another variation, users can be offered a means on the mobile device to say "more" or the equivalent, and accordingly demand that more content meeting the preferences be provided. This can be in addition to the automated server pushes described above. Related to this, the user can be given access on the mobile device to enter all or a portion of the preferences described above, such as preferred genres of music and preferred artists, so as to obviate need to utilize the PC at any point.

Further, as may be directed by the server, the new playlists can either amend or modify, or completely replace, playlists that were previously made available to the device. In this way, more incremental changes can be made to the playlist over time, providing a balance of "core" or "essential" music on the device with new, fresh content. Preferentially, the device also provides more information back to the server about the user's behavior, which is further used to enhance the user's experience and relevancy and attractiveness of the content selections. In particular, the device may report what songs were played (and, by implication, not played) by the user, as well as which songs were skipped (and, by implication, played and not skipped) by the user. This reporting can all take place on a mobile phone, for example, by over-the-air sending of data at opportune times, in an asynchronous fashion.

Numerous modifications may be made to the invention without departing from its scope as defined in the appended claims.

We claim:

1. An apparatus for acquiring digital content, the apparatus comprising:
    a storage device;
    a first wireless transceiver operative to communicate with a cellular network;
    a second wireless transceiver operative to communicate with a wireless gateway; and
    a processor operative to:
        use the first wireless transceiver to communicate with an external database via the cellular network to search the external database for digital content to download to the apparatus, wherein the external database stores a listing of digital content available for downloading from the external memory;
        use the second wireless transceiver to communicate with the external memory via the wireless gateway to download digital content identified by the search; and
        store the downloaded digital content in the storage device and play the downloaded digital content.

2. The apparatus of claim 1, wherein the processor is further operative to determine whether to use the first wireless transceiver or the second wireless transceiver to download the digital content identified by the search based on cost.

3. The apparatus of claim 1, wherein the processor is further operative to determine whether to use the first wireless transceiver or the second wireless transceiver to download the digital content identified by the search based on at least one of latency, contention, delivery speed, and bandwidth.

4. The apparatus of claim 1, wherein the processor is further operative to use the first wireless transceiver and the second wireless transceiver concurrently.

5. The apparatus of claim 1, wherein the processor is further operative to automatically determine whether to use the first wireless transceiver or the second wireless transceiver.

6. The apparatus of claim 1, wherein the processor is further operative to determine whether to use the first wireless transceiver or the second wireless transceiver based on a user programmable attribute.

7. The apparatus of claim 1, wherein the cellular network comprises one of the following: a GSM network, a CDMA network, a TDMA network, an EDGE network, an EvDO network, a 2G cellular network, a 2½G cellular network, a 3G cellular network, and a 4G cellular network.

8. The apparatus of claim 1, wherein the apparatus comprises a phone with a digital audio/video player.

9. The apparatus of claim 1, wherein the processor is further operative to choose the first wireless transceiver or the second wireless transceiver for connectivity based on business and performance goals.

10. The apparatus of claim 1, wherein the first wireless transceiver comprises a wireless chip, and wherein the second wireless transceiver comprises a WiFi transceiver.

11. A method for a user controlled device to acquire digital content, the method comprising:
    performing the following in a user controlled device:
        communicating with an external database via a telephone network to search the external database for digital content to download to the user controlled device, wherein the external database stores a listing of digital content available for downloading from an external memory;

communicating with the external memory via a wireless network to receive the digital content identified by the search from the external memory and playing the received digital content;

wherein the user controlled device comprises a first wireless transceiver operative to communicate with the telephone network and a second wireless transceiver operative to communicate with the wireless network.

12. The method of claim 11, wherein the telephone network comprises a cellular network.

13. The method of claim 11, wherein the telephone network comprises a POTS network.

14. The method of claim 11, wherein the digital content includes messaging data displayable on the user controlled device.

15. The method of claim 14, further comprising displaying the messaging data in a pop-up screen.

16. The method of claim 14, further comprising displaying the messaging data in a box.

17. The method of claim 14, wherein the messaging data includes one of the following: billing messages, TOS messages, and messages related to content.

18. The method of claim 14, wherein the messaging data includes at least one of the following: an audio message, a video, an image, text, text-to-speech message.

19. The method of claim 11 further comprising:

using an interactive voice response system to search the external database for the digital content to download to the user controlled device.

20. The method of claim 11, wherein the first wireless transceiver comprises a wireless chip, and wherein the second wireless transceiver comprises a WiFi transceiver.

21. The method of claim 11 further comprising storing the digital content in the user controlled device.

22. The method of claim 11, wherein the digital content is streamed to the user controlled device from the external memory.

* * * * *

UNITED STATES PATENT AND TRADEMARK OFFICE
CERTIFICATE OF CORRECTION

| | | |
|---|---|---|
| PATENT NO. | : 7,881,656 B2 | Page 1 of 1 |
| APPLICATION NO. | : 11/964107 | |
| DATED | : February 1, 2011 | |
| INVENTOR(S) | : Robert Khedouri et al. | |

It is certified that error appears in the above-identified patent and that said Letters Patent is hereby corrected as shown below:

In the Claims

Column 36, claim 1, line 22, before "external memory" replace "the" with --an--.

Column 36, claim 1, line 25, after "identified by the search;" delete "and".

Column 36, claim 1, line 27, immediately after "device" insert --;--.

Column 36, claim 1, line 27, start a new paragraph with the words "play the downloaded digital content".

Column 37, claim 11, line 6, immediately after "the external memory" insert --;--.

Column 37, claim 11, lines 6-7, start a new paragraph with the words "playing the received digital content".

Signed and Sealed this
Seventeenth Day of May, 2011

David J. Kappos
*Director of the United States Patent and Trademark Office*